(12) United States Patent
Martin

(10) Patent No.: US 6,290,023 B1
(45) Date of Patent: Sep. 18, 2001

(54) SPORTS UTILITY TRAILER

(76) Inventor: Harlan Martin, 448 Vickery St. Extension, Hartwell, GA (US) 30643

( * ) Notice: Subject to any disclaimer, the term of this patent is extended or adjusted under 35 U.S.C. 154(b) by 0 days.

(21) Appl. No.: 09/387,022

(22) Filed: Aug. 31, 1999

(51) Int. Cl.$^7$ .............................. E06C 5/00; E04C 1/00; B62D 63/06
(52) U.S. Cl. .................... 182/127; 182/63.1; 280/789
(58) Field of Search .................... 182/63.1, 115, 182/127; 280/511, 789

(56) References Cited

U.S. PATENT DOCUMENTS

| | | |
|---|---|---|
| 1,221,579 | 4/1917 | Olds . |
| 3,406,784 | 10/1968 | Jones et al. ............... 182/97 |
| 3,485,321 * | 12/1969 | Smith, Jr. ............. 182/63.1 X |
| 3,882,964 | 5/1975 | Schellenberg ............ 182/63 |
| 4,171,033 * | 10/1979 | Rust et al. ............. 182/63.1 |
| 4,397,373 | 8/1983 | Ream et al. ............. 182/17 |
| 4,442,919 | 4/1984 | Fulcher ................. 182/63 |
| 4,529,063 | 7/1985 | Kishi ................... 187/9 |
| 4,719,716 | 1/1988 | Chrisley, Jr. ............ 43/1 |
| 4,800,986 | 1/1989 | Hayes, III .............. 182/18 |
| 5,102,179 | 4/1992 | Royer ................... 296/26 |
| 5,105,908 | 4/1992 | Freund .................. 182/20 |
| 5,295,555 | 3/1994 | Strange ................. 182/63 |
| 5,409,081 | 4/1995 | Reeves .................. 182/63 |
| 5,862,827 | 1/1999 | Howze ................... 135/901 |

* cited by examiner

*Primary Examiner*—Daniel P. Stodola
*Assistant Examiner*—Hugh B. Thompson
(74) *Attorney, Agent, or Firm*—John S. Pratt, Esq.; Kilpatrick Stockton LLP

(57) ABSTRACT

A system and apparatus for converting a trailer to an observation stand. The sports utility trailer has a chassis frame hingeably connected to a tailgate platform. At least one wheel on the bottom of the chassis frame supports the chassis frame above the ground when the sports utility trailer is a trailer. A ladder mounts to the chassis frame to provide access from one end of the chassis frame to the other when the frame is supported in an upright position where one end is raised substantially higher than the opposing end of the frame. A tongue guide is mounted to the front end of the frame to support a conventional ball hitch socket for towing or transporting the sports utility trailer behind a vehicle. Removable legs from the chassis frame mount to the bottom side of the tailgate platform. When the legs are mounted beneath the tailgate platform, the tailgate platform is raised above the ground so that the legs and the upright chassis frame support the tailgate platform above the ground. By climbing the ladder from the ground to the top side of the tailgate platform, the sports utility trailer can be used as an observation stand.

22 Claims, 17 Drawing Sheets

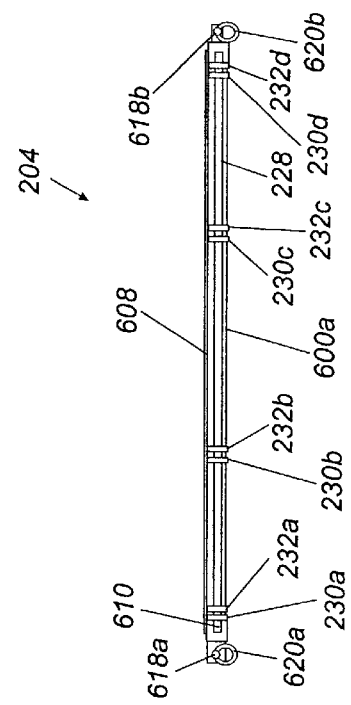
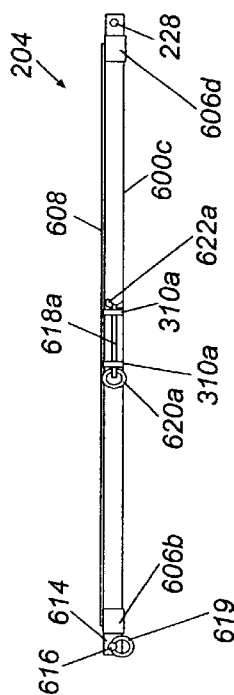
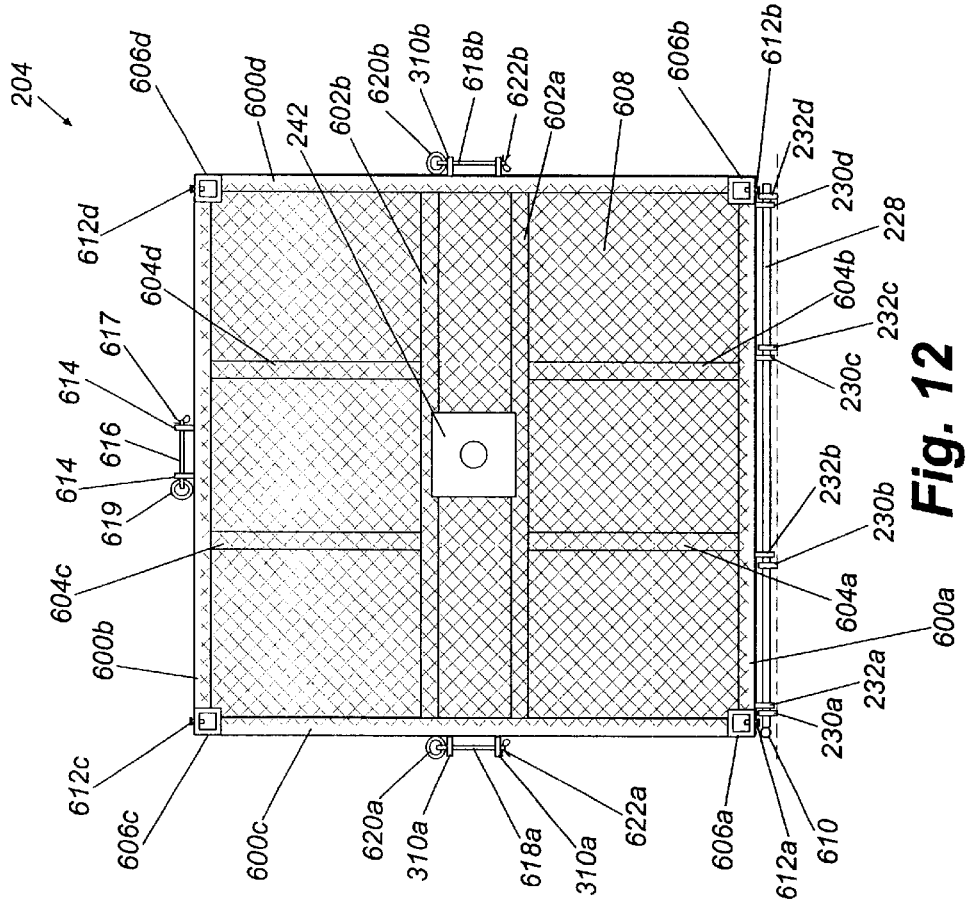
Fig. 13
Fig. 14
Fig. 12

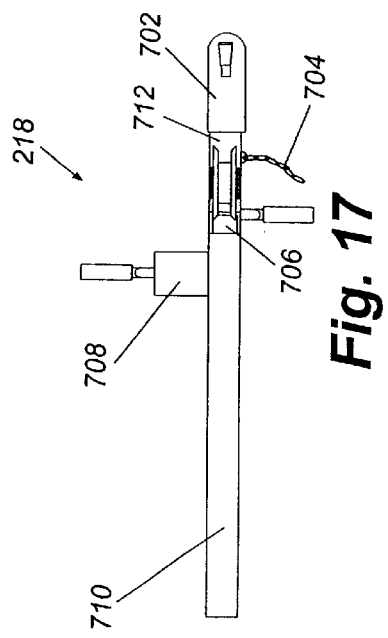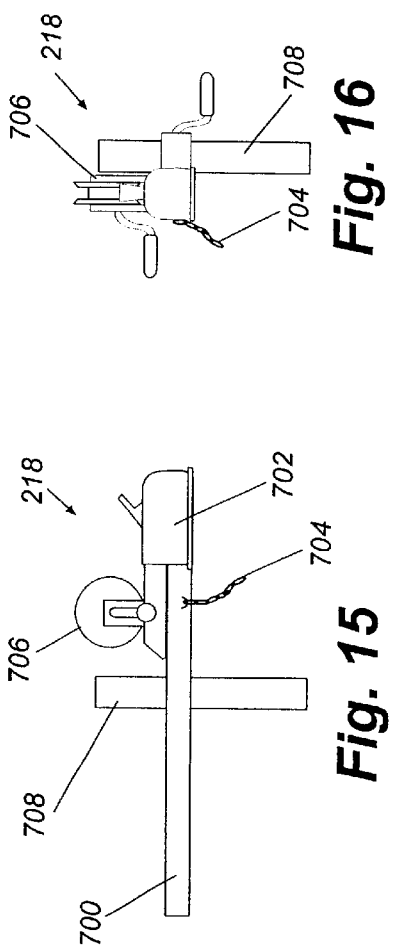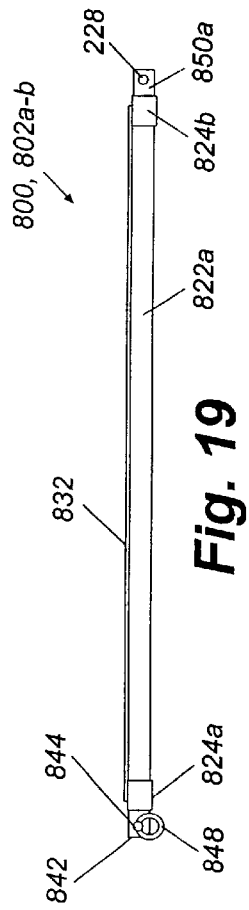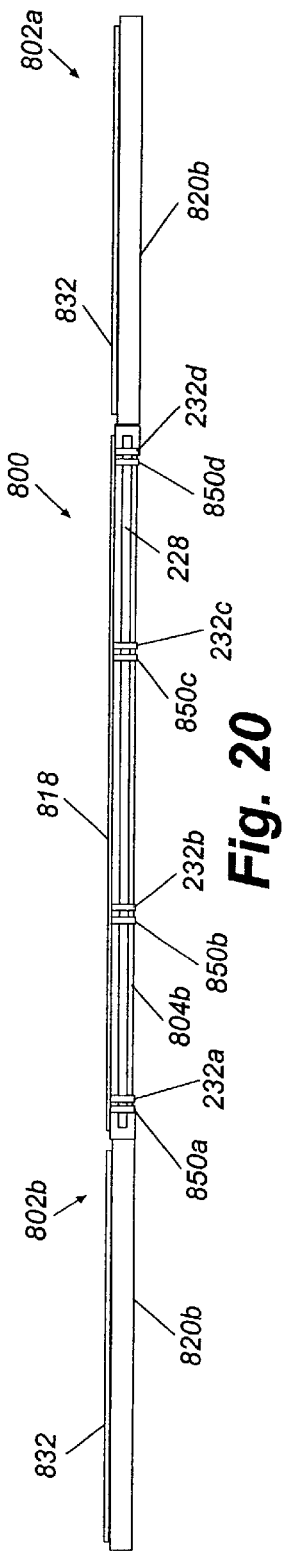

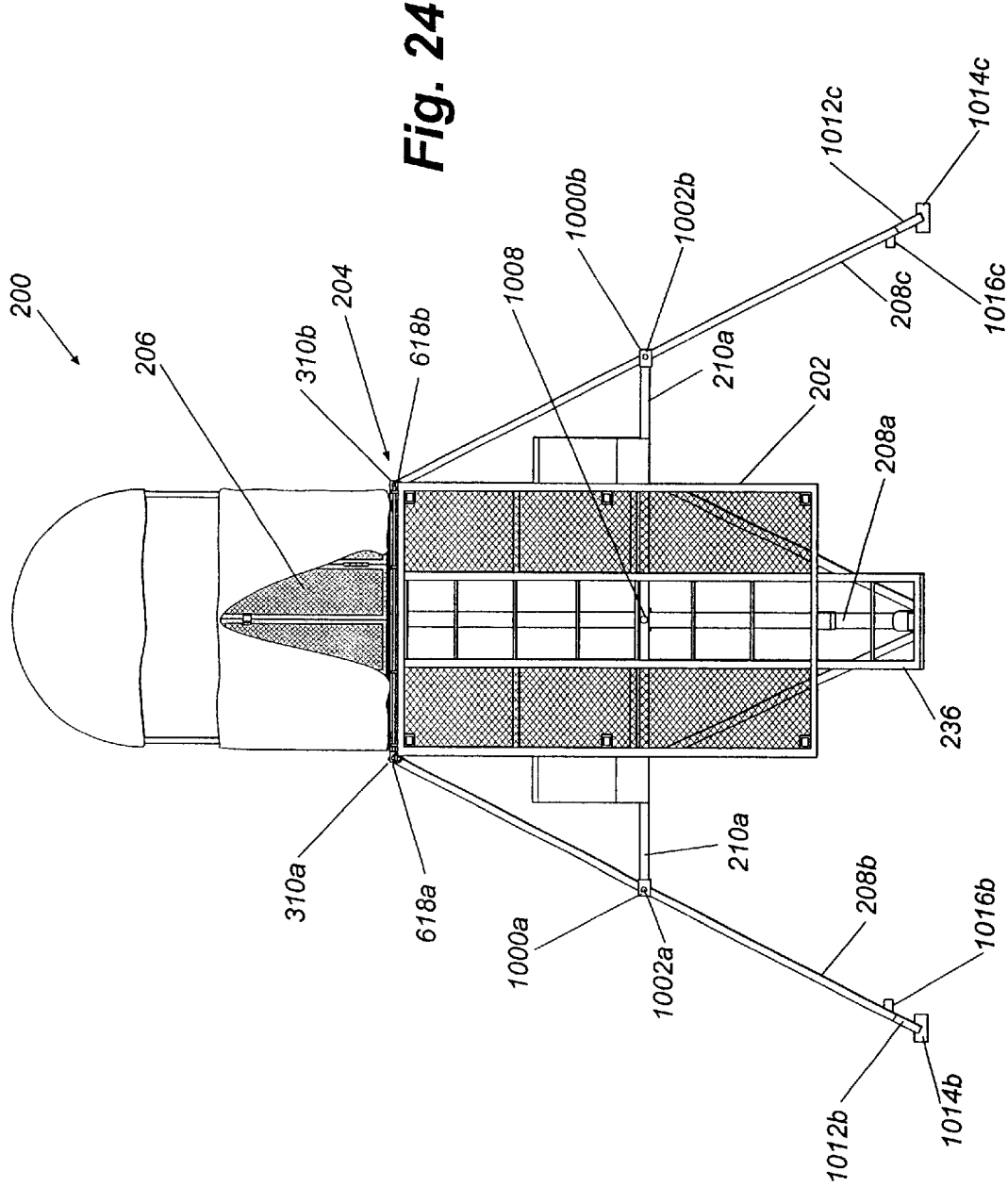

SPORTS UTILITY TRAILER

TECHNICAL FIELD

This invention relates generally to vehicles and, more particularly, to a trailer that converts to an observation stand.

BACKGROUND OF THE INVENTION

A variety of recreational activities provide people with time away from the workplace. Many people enjoy recreational activities with their families, friends, and co-workers. Popular recreational activities in the United States include outdoor activities such as hunting, fishing, water sports, cycling, mountain biking, and the like. Americans spend a significant amount of money every year to participate in such outdoor recreational activities.

The average American has access to or knows someone with access to an automobile. The mobility of the average American has created the desire to travel in order to pursue their favorite recreational activities. In some cases, outdoor recreational activities require the use of large gear or bulky equipment in order to participate in the activity. Generally, the sports and recreation enthusiast is limited by the interior capacity of his automobile or by the ability of his automobile to carry equipment on the exterior of the automobile.

Some people have obtained trailers for their automobiles to carry recreational gear or equipment that ordinarily would not fit inside or cannot be secured safely to the exterior of their automobile. Trailers are useful in the art for their ability to hitch to the rear of an automobile, thus permitting an operator of the automobile to pull the trailer behind the automobile. Depending upon the size and capacity of the trailer, large or bulky items can be placed on board of the trailer for transport. Typically, trailers can carry boxes, luggage, firewood, tools, machinery, or other ordinary items. Some trailers are specially equipped to secure and to carry recreational equipment, such as motorcycles, mountain or dirt bikes, all-terrain vehicles, jet skis, or the like.

Recreational activities can involve the use of an observation stand. Observation stands are useful for elevating a person from the ground to a relatively higher position. From a higher position, the person gains a greater vantage point from which to observe the local surroundings, thus permitting the person to gather more information about the local surroundings within the person's line of sight. Typically, observation stands are used in military operations, forestry services, game and wildlife hunting, sporting events, and other outdoor recreational activities.

Generally, observation stands are stationary platforms supported above the ground. For example, hunters and gamesmen erect deer stands above the ground to increase their line of sight over their local surroundings. In another recreational example, a spectator in the infield of a race track during a NASCAR race may want to watch the race. However, the number of recreational vehicles and pickup trucks may block the spectator's view of the race.

A relatively large observation stand cannot be transported easily. In some cases, breaking down a relatively large observation stand can be cumbersome or impractical such that transporting the stand to a new location is not feasible. Sometimes, those stands that can be transported cannot be hauled safely in a trailer behind an automobile. The time expended in breaking down an observation stand to be transported on a trailer can be time consuming. Once the observation stand is secured to a trailer, the stand can be transported to a new location by automobile. When the stand reaches the new location, additional time is expended in setting up the observation stand. In some cases, more than one person may be needed to break down and to set up the observation stand.

Thus, there is a need for a system and apparatus for a portable observation stand.

There is a further need for a system and apparatus for converting a trailer into an observation stand.

SUMMARY OF THE INVENTION

The present invention meets the needs described above in a sports utility trailer that can be converted from a trailer to an observation stand. The sports utility trailer provides a system and apparatus for a portable observation stand. Furthermore, the sports utility trailer provides a system and apparatus for converting a trailer into an observation stand.

Generally described, the invention is a sports utility trailer that converts from a trailer to an observation stand. The sports utility trailer contains removable components that are integrated into the structure of a trailer and can be used to erect an above-ground observation stand. A chassis frame forms the vehicular body for trailer mode of the sports utility trailer. One or more removable legs can be integrate into or carried by the chassis frame. At least one wheel supports the chassis frame above the ground while in the trailer mode. A removable tailgate platform mounts to the rear end of the chassis frame with a removable hinge pin and a hinge. A tongue guide mounts to the front end of the chassis frame and can be configured to mount a conventional ball hitch socket for towing or transporting the sports utility trailer behind a vehicle.

When the sports utility trailer is ready to be converted from a trailer to an observation stand, the removable legs are removed from the chassis body. The removable legs are mounted to the bottom side of the tailgate platform. A cable can then be attached to the free end of the rearmost leg, and a pulling force is applied to the cable. When the rear leg is pulled forward, the side legs act as a fulcrum as the tailgate platform is pulled upward and forward towards the pulling force. The rear end of the chassis frame will begin to be raised as the pulling force continues to pull the rear leg. The weight of the tailgate platform above the ground will force the rear leg downward to the ground as the pulling force continues to erect the observation stand. When the observation stand is erected, the legs and the chassis frame will be in a substantially upright position supporting the tailgate platform above the ground in a substantially horizontal position. The tailgate platform can then be used as an above-ground observation stand.

More particularly described, a sports utility trailer includes removable bowed supports and support struts mounted to the top side of the chassis frame to form a trailer enclosure on top of the sports utility trailer. The bowed supports and support struts can be removed from the top side of the chassis frame prior to erecting the observation stand. The bowed supports and the support struts can then be mounted on the top side of the tailgate platform to provide an enclosure on top of the platform.

A sports utility trailer can include a removable frontwall panel mounted to the front edge of the chassis frame. The frontwall panel can be removed prior to erecting the observation stand and the panel can be mounted on the front edge of the tailgate platform. The frontwall panel provides an access door through the panel for the user to pass through upon entry into the enclosure on top of the tailgate platform.

A sports utility trailer can include a ladder integrated into the chassis frame to provide a recess to install removable legs and leg struts within the frame. The ladder forms a portion of the chassis frame. When the frame is erected to support the tailgate platform above the ground, the ladder provides user access from the ground to the top of the platform.

A sports utility trailer can include a swivel seat mounted to the top of the tailgate platform. The swivel seat mounts substantially above the surface of the platform, providing the user with a raised position to sit or kneel upon.

A sports utility trailer can include a chassis covering to protect the top of the chassis frame from environmental elements. When the chassis frame has bowed supports and support struts mounted on the top side of the frame, different sized sections of a chassis covering can be tied down over the supports. Cords, ties, and ropes can be tied through grommets sewn into the edges of the chassis covering sections for easier installation and removal of the covering.

A sports utility trailer can also include a Supersport tailgate that widens the above-ground platform for the observation stand. One or more swivel seats can be mounted to the top side of the Supersport tailgate, and the tailgate can support one or more persons walking, sitting, or standing on top of the tailgate when the tailgate is above the ground.

That the invention improves over the prior art and accomplishes the advantages described above will become apparent from the following detailed description of the exemplary embodiments and the appended drawings and claims.

BRIEF DESCRIPTION OF THE DRAWINGS

FIG. 12 is a top view of a tailgate platform of the SUT shown in FIG. 2.

FIG. 13 is a front view of a tailgate platform of the SUT shown in FIG. 2.

FIG. 14 is a side view of a tailgate platform of the SUT shown in FIG. 2.

FIG. 15 is a side view of a tongue assembly of the SUT shown in FIG. 2.

FIG. 16 is a front view of a tongue assembly of the SUT shown in FIG. 2.

FIG. 17 is a top view of a tongue assembly of the SUT shown in FIG. 2.

FIG. 19 is a front view of a Supersport tailgate of the SUT shown in FIG. 2.

FIG. 20 is a side view of a Supersport tailgate of the SUT shown in FIG. 2.

FIG. 24 is a front view of an erected observation stand of the SUT shown in FIG. 2.

DETAILED DESCRIPTION OF THE DISCLOSED EMBODIMENTS

The invention may be implemented as a sports utility trailer (SUT). The SUT converts from a trailer to an above-ground observation stand. In the trailer mode, the SUT can be transported behind a conventional automobile or vehicle, such as an ATV, and can be utilized to carry bulky or numerous items or equipment. The SUT can be covered with a chassis covering to provide the interior cargo protection from environmental elements. While the SUT is in this mode, the SUT can be used as a camping shelter, dry storage for goods, as well as a trailer.

A majority of the components forming the trailer are utilized to convert the trailer to an above-ground observation stand. After conversion to an observation stand, the SUT can be utilized as an above-ground platform for a variety of recreational or outdoor activities.

The structural components used to construct a SUT can be made from conventional steel, such as A36 grade carbon steel. Other similar materials or different grades of steel can be used to construct a SUT depending upon the loads to be supported by the SUT as a trailer or as an observation stand. Different sizes of structural components can be used depending upon the loads to be supported by the SUT.

Conventional connections between steel components are used to construct a SUT. For example, conventional welding materials are used in accordance with conventional welding practices and procedures to attach the steel components together. Other connections between steel components can be made using conventional pins, such as cotter pins.

Figure 1:
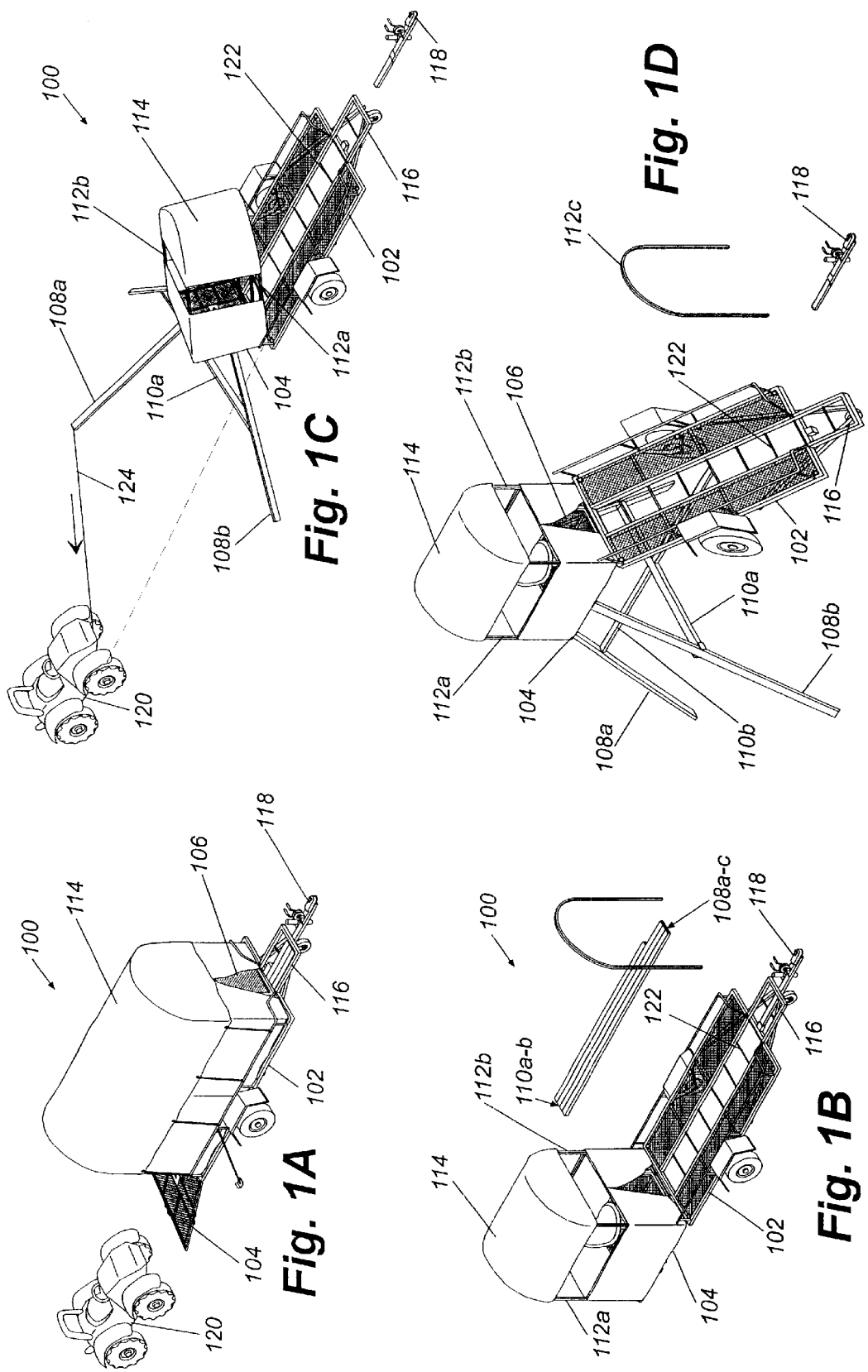
FIGS. 1A–D depict the conversion of the Sports Utility Trailer (SUT) from a trailer to an erected observation stand.

FIGS. 1A–D illustrate a conversion of a sports utility trailer (SUT) 100 from a trailer to an observation stand. In FIG. 1A, a sports utility trailer 100 is shown in a fully assembled trailer mode.

FIG. 1B illustrates the SUT 100 of FIG. 1A during the conversion of the SUT 100 from a trailer to an observation stand. The sports utility trailer 100 includes a chassis frame 102, a tailgate platform 104, a removable frontwall panel 106, a removable set of legs 108a–c and leg struts 110a–b, a set of bowed supports 112a–c, and a chassis covering 114. All of the main components used for conversion of the SUT 100 into an observation stand are part of the chassis frame 102 or are installed on the chassis frame 102 while the SUT 100 is in the trailer mode.

The chassis frame 102 forms the vehicle body of the SUT 100. While the SUT 100 is in the trailer mode in FIG. 1A, the chassis frame 102 is positioned substantially parallel with the ground. A tongue guide 116 mounts to the bottom side of the frame 102 and extends outward from the front of the frame 102. The tongue guide 116 receives a tongue assembly 118 to permit another vehicle to pull or tow the SUT 100. The tongue assembly 118 can be fitted with a conventional ball hitch socket to mount to a ball hitch on a tow vehicle for towing or transporting the SUT 100.

Removable bowed supports 112a–c extending from the top side of the chassis frame 102 support the chassis covering 114 when the SUT 100 is in the trailer mode. The bowed supports 112a–c are steel beams preformed into a U-shape. The top side of the chassis frame 102 supports the ends of the bowed supports 112a–c such that each bowed support 112a–c extends upward from the top of the frame 102. Each bowed support 112a–c spans the width of the chassis frame 102 from the left side of the frame 102 to the right side. The chassis covering 114 can be tied down or attached to the bowed supports 112a–c to provide a covered enclosure on top of the chassis frame 102 and within the bowed supports 112a–c.

The rear end of the chassis frame 102 supports the tailgate platform 104. As shown in FIG. 1A, the tailgate platform 104 is in an open position illustrating the function of the tailgate platform 104 as an access ramp into the rear end of the chassis frame 102. Access into the SUT 100 is useful for loading and unloading items or equipment, such as an all-terrain vehicle (ATV) 120 as shown. When the SUT 100 is ready to be towed or transported, the tailgate platform 104 can be placed in an upright position relative to the frame 102. Closing the tailgate platform 104 provides a rear wall for the SUT 100, preventing equipment from falling out of the rear of the SUT 100.

The removable frontwall panel 104 provides a frontwall for the SUT 100. The removable frontwall panel 106 is designed with hinged and lockable doors to provide and to restrict access through the frontwall panel itself. The removable frontwall panel 106 can be supported at the front edge of the chassis frame 102, spanning the width of the chassis frame 102.

The SUT 100 is shown in FIG. 1B with some of the stowed or installed components of the trailer now removed from or disassembled from the SUT 100. Using components separated from the chassis frame 102, the SUT 100 can be converted into an observation stand. First, the chassis covering 114 is removed from the bowed supports 112a–c on top of the chassis frame 102. Two of the bowed supports 112a–b are then removed from the top side of the chassis frame 102 and installed onto the top side of the tailgate platform 104. The other bowed support 112c can be used with other tailgate platform embodiments. The frontwall panel 106 can be removed from the front edge of the chassis frame 102 and installed at the front edge of the tailgate platform 104 within one of the bowed supports 112a–c. The frontwall panel 106 then functions as the lockable access door for the observation stand. The chassis covering 114 can be installed over the bowed supports 112a–c and a portion of the frontwall panel 106 on the tailgate platform 104 to form an enclosure for the observation stand.

Without the bowed supports 112a–c and the chassis covering 114, the chassis frame 102 can be viewed in FIG. 1B. The chassis frame 102 can include a ladder 122, removable legs 108a–c and leg struts 110a–b. The ladder 122 integrates into the center portion of the chassis frame 102, extending lengthwise along the chassis frame 102 from the front end to the rear end of the frame 102. The ladder 122 is slightly recessed into the top of the chassis frame 102 to accommodate other components during transport, such as the removable legs 108a–c and leg struts 110a–b. When the removable legs 108a–c and leg struts 110a–b are within the ladder 122 recess, the removable legs 108a–c and leg struts 110a–b fill in the spaces within the ladder 122 to prevent items or equipment from falling through the spaces. As shown in FIG. 1B, the removable legs 108a–c and leg struts 126a–c can then be removed from the ladder 122 recess during conversion of the SUT 100 from a trailer to an observation stand.

FIG. 1C shows the SUT 100 of FIG. 1A with an ATV 120 assisting in erecting the SUT 100 into an observation stand. The removable legs 108a–c and struts 126a–c install into the bottom side of the tailgate platform 104. Typically, a cable 124 or other type of line can be attached to the bottom of the rear leg 108a. The two side legs 108b–c mount to the bottom of the tailgate platform 104 and act like a fulcrum when the ATV 120 pulls the cable 124 attached to the rear leg 108a. When sufficient force is applied to the cable 124, the rear leg 108a is pulled downward and the tailgate platform 104 will be raised upward and towards the ATV 120. The chassis frame 102 rolls on its wheels towards the ATV 120, and rear end of the frame 102 will be raised upward with the tailgate platform 104 as the ATV 120 pulls the cable 124. When the rear end of the frame 102 lifts off of the ground, the ATV 120 will continue to pull on the cable 124. The two side legs 108b–c continue to support the weight of the SUT 100 as the rear leg 108a nears the ground. When the rear leg 108a approaches the ground, the weight of the raised tailgate platform 104 swings the rear leg 108a downward to the ground. When the rear leg 108a reaches the ground, the rear leg 108a, the two side legs 108b–c, and the tongue guide 116 attached to the chassis frame 102 will support the tailgate platform 104 substantially parallel to and above the ground, thus completing the erection process for converting the SUT 100 from a trailer to an observation stand.

The use of an ATV 120 to erect the SUT 100 into an observation stand is shown by way of example. Other vehicles, devices, or other methods of leveraging the SUT 100 to lift the tailgate platform 104 above the ground can be utilized. In addition, ropes, chains, wires, and the like can also be used in place of the cable 124 to assist the erection of the SUT 100 into an observation stand. For example, the tongue assembly 118 can be mounted onto a pin driven into the ground. In place of the ATV 120, a cable winch mounted on the tongue assembly 118 can then erect the SUT 100 in the manner described and shown in FIG. 1C.

FIG. 1D shows the SUT 100 of FIG. 1A in an erected mode for use as an observation stand. The chassis frame 102, tongue guide 122, and removable legs 108a–c are shown in an upright position supporting the tailgate platform 104 above the ground. The tailgate platform 104 remains hinged to the rear end of the chassis frame 102 while forming the above-ground platform. Leg struts 110a–b are attached between the removable legs 108a–c and the bottom side of the chassis frame 102 to stabilize the relative positions of the legs 108a–c with the chassis frame 102. The bowed supports 112a–c and the frontwall panel 106 are supported on the top side of the tailgate platform 104 to extend upward from the tailgate platform 104 to form the enclosure for the chassis covering 114 on top of the tailgate platform 104. The chassis covering 114 can be placed over the bowed supports 112a–c and a portion of the frontwall panel 106 to provide a covered enclosure on top of the tailgate platform 104. The ladder 122 built into the top side of the chassis frame 102 provides access from the ground to the top side of the tailgate platform 104. Doors in the frontwall panel 106 provide access through the frontwall panel 106 into the enclosure of the observation stand.

Figure 2:
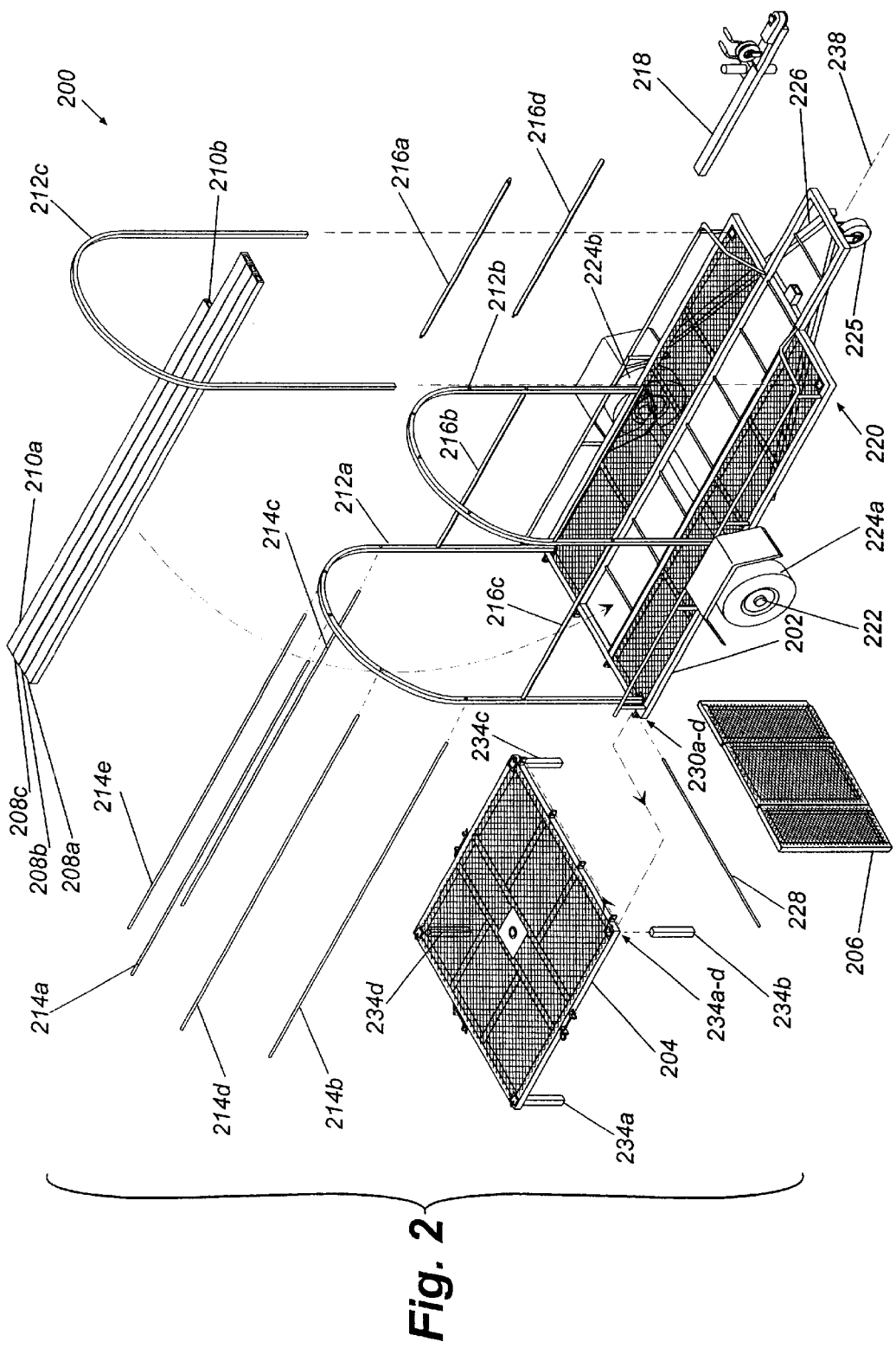
FIG. 2 is an exploded perspective view of the SUT shown in an uncovered trailer mode.

FIG. 2 illustrates an exploded perspective view of the sports utility trailer (SUT) 200 in an uncovered trailer mode. In an uncovered trailer mode, the SUT 200 can carry items and equipment. The uncovered trailer mode can be utilized when any type of covering, such as chassis covering, may hinder the loading or unloading of an item. For example, the SUT 200 can carry items and equipment such as a HONDA Model 300 all-terrain vehicle (ATV), a POLARIS jet ski, several motorbikes or mountain bikes, or a motorcycle such as a HARLEY-DAVIDSON.

As described previously, the SUT 200 in a trailer mode disassembles into several components including the chassis frame 202, the tailgate platform 204, the frontwall panel 206, removable legs 208a–c and leg struts 210a–b, bowed supports 212a–c and support struts 214a–e, 216a–d, and a tongue assembly 218.

The chassis frame 202 forms the vehicle body upon which the SUT 200 is built upon. The chassis frame 102 can include a steel frame 220, an axle 222 and two wheels 224a–b, a front guide wheel 225, and a tongue guide 226. An axle 222 attaches to the bottom side of the steel frame 220 to support the two wheels 224a–b upon which the steel frame 220 can be towed or transported. The tongue guide 226 attaches to the bottom of the steel frame 220 and extends from the front end of the steel frame 220. The front guide wheel 225 mounts to the front end of the tongue guide 226 to support the front end of the steel frame 220 when the SUT 200 is not being towed or transported.

The chassis frame 202 is shown separated from the tailgate platform 204. The tailgate platform 204 can be removed from the rear end of the chassis frame chassis frame 202 by removal of a hinge pin 228. The hinge pin 228 can be removed from a series of hinge plates 230a–d, 232a–d at the front edge of the tailgate platform 204 and the rear edge of the chassis frame 202, so that the hinge pin 228 no longer connects the front end of the tailgate platform 204 to the rear end of the chassis frame 202. When the tailgate platform 204 is removed from the chassis frame 202, the SUT 200 can carry loads that extend from the rear edge of the frame 202. For example, the SUT 200 can carry lumber or rolled carpet relatively longer than the frame 202. Furthermore, the SUT 200 can carry loads that extend above of the bowed supports 112a–c when the bowed supports 112a–c are mounted on top of the chassis frame 202.

Even when the tailgate platform 204 is separated from or attached to the chassis frame 202, the tailgate platform 204 can be a raised platform or as a table. Leveling jacks 234a–d positioned in the corners of the tailgate platform 204 support the tailgate platform 204 above the ground. For example, the tailgate platform 204 could be a raised platform during recreational activities such as camping. When the bowed supports 112a–c are mounted to the top of the tailgate platform 204, the chassis covering can be placed over the bowed supports 112a–c to provide a covered shelter. A leveling jack 234a–d can be any adjustable device that can support the corner of the tailgate platform 204 and adjustably raise the corner of the platform 204 above the ground.

The removable legs 208a–c and the leg struts 210a–b are shown removed from the top side of the chassis frame 202. Typically, the legs 208a–c and the leg struts 210a–b mount within the recessed ladder 236 at the center portion of the chassis frame 202 during transport or storage of the SUT 200.

The chassis frame 202 is shown with the two of the three bowed supports 212a–c mounted substantially perpendicular to the chassis frame 202. Each of the bowed supports 212a–c can be removed from the top side of the frame 202. Removable support struts 214a–e, 216a–d between the installed bowed supports 212a–c are positioned parallel with the center axis 238 of the chassis frame 202 to increase the rigidity of the supports with respect to the chassis frame 202. Five long support struts 214a–e pass through holes machined in the arcuate portions of the three bowed supports 212a–c.

Four shorter support struts 216a–d approximately half as long as the long struts 214a–e are positioned parallel to and below the long support struts 214a–e. One short strut 216a is positioned between the front bowed support 212c and the center support 212b on the left side of the frame 202, and a short strut 216b is positioned between the front bowed support 212c and the center support 212b on right side of the frame 202. Another pair of short struts 216c–d is positioned between the center bowed support 212b and the rear support 212a, one short strut 216c on the left side of the frame 202, and one short strut 216d on the right side of the frame 202.

The removable tongue assembly 218 is shown connecting to the front of the chassis frame 202. The tongue assembly 218 mounts to a tongue guide 226 at the front of the chassis frame 202 to permit the chassis frame 202 to be connected to a tow vehicle to pull the chassis frame 202 behind the tow vehicle. The tongue assembly 218 is further shown and described in FIGS. 15–17.

Figure 3:
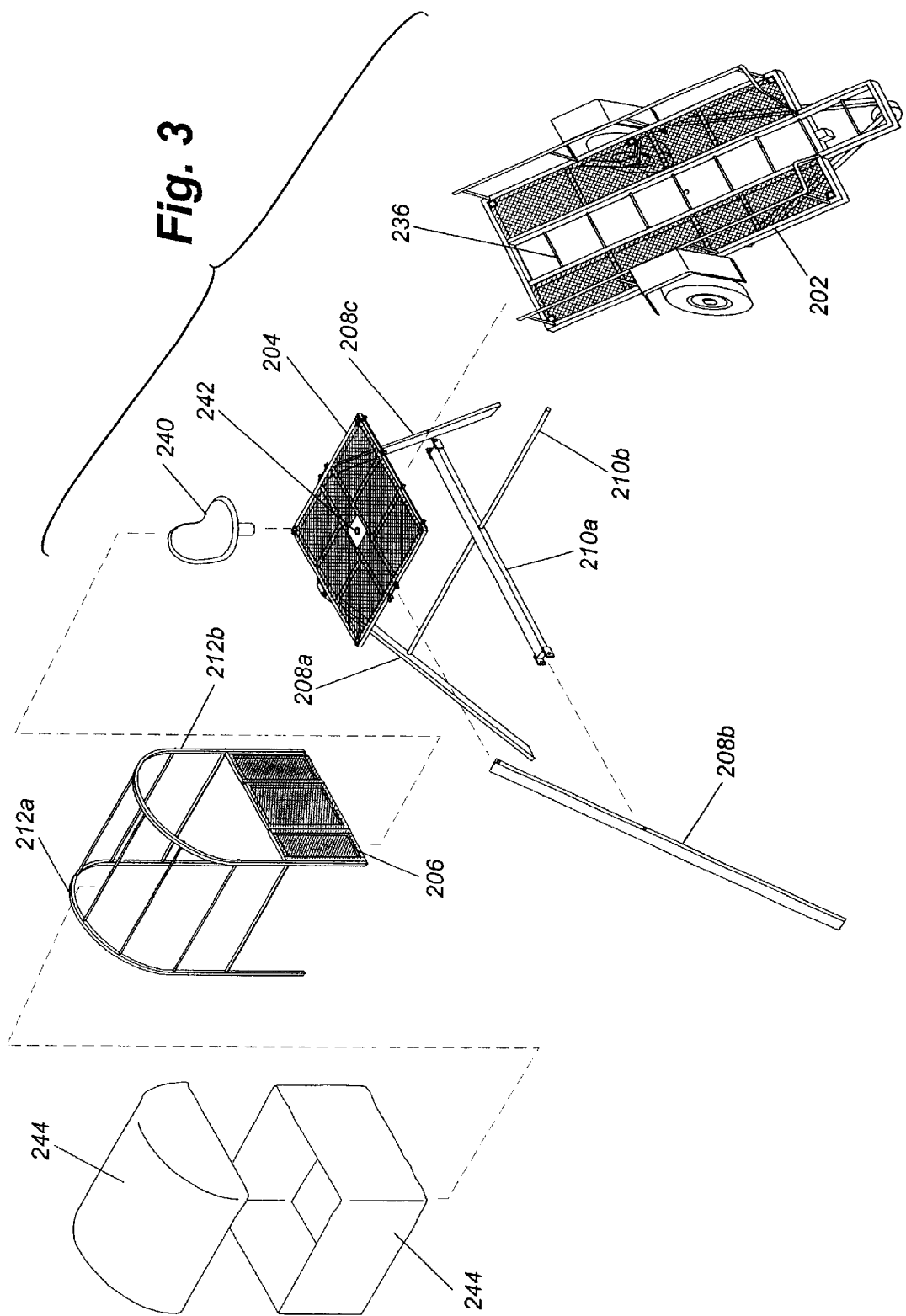
FIG. 3 is an exploded perspective view of the SUT shown in an uncovered erected observation stand mode.

FIG. 3 illustrates an exploded perspective view of the SUT 200 of FIG. 2 shown in an erected observation stand mode. The chassis frame 202 is shown as one of the supports underneath the front end of the tailgate platform 204. Three removable legs 208a–c mount beneath each of the other sides of the tailgate platform 204 to support the platform 204 above the ground. Leg struts 210a–b connect between each of the side legs 208b–c, and between the rear leg 208a and the bottom side of the chassis frame 202 to hold the legs 208a–c relative to the chassis frame 202. The bowed supports 212a–c and support struts 216a–d mount on top of the tailgate platform 204. The frontwall panel 206 also mounts to the top side of the platform 204 within the straight portions one of the bowed supports 212a–c to form the frontwall of the enclosure on top of the platform 204. A swivel seat 240 mounts into a mounting plate 242 in the center portion of the tailgate platform 204. The chassis covering 244 can be placed over the bowed supports 212a–c and a portion of the frontwall panel 206 to provide a covered enclosure for the observation stand.

The versatility of each component of the SUT 200 is shown by a comparison of the components used in FIGS. 2 and 3. Many of the components are utilized in constructing a trailer or in constructing an observation stand. For example, the tailgate platform 204 can be a loading ramp and a tailgate for the trailer, and also functions as the above-ground platform for the observation stand. The chassis frame 202 functions as a load bed for the trailer and then becomes one of the legs for supporting the tailgate platform 204 above the ground. Each of the removable legs 208a–c that form the top side of the chassis frame 202, also functions as a support for the tailgate platform 204 when the platform 204 is above the ground. The bowed supports 212a–c are used for the enclosure on top of the trailer and for the tailgate platform 204 when the observation stand is erected. The frontwall panel 206 functions as an entry gate for both the trailer and for the enclosure at the top of the tailgate platform 204. The ladder 236 that also forms the top side of the chassis frame 202, functions as an access ladder between the ground and the top of the tailgate platform 204 when the observation stand is erected.

Figure 4:
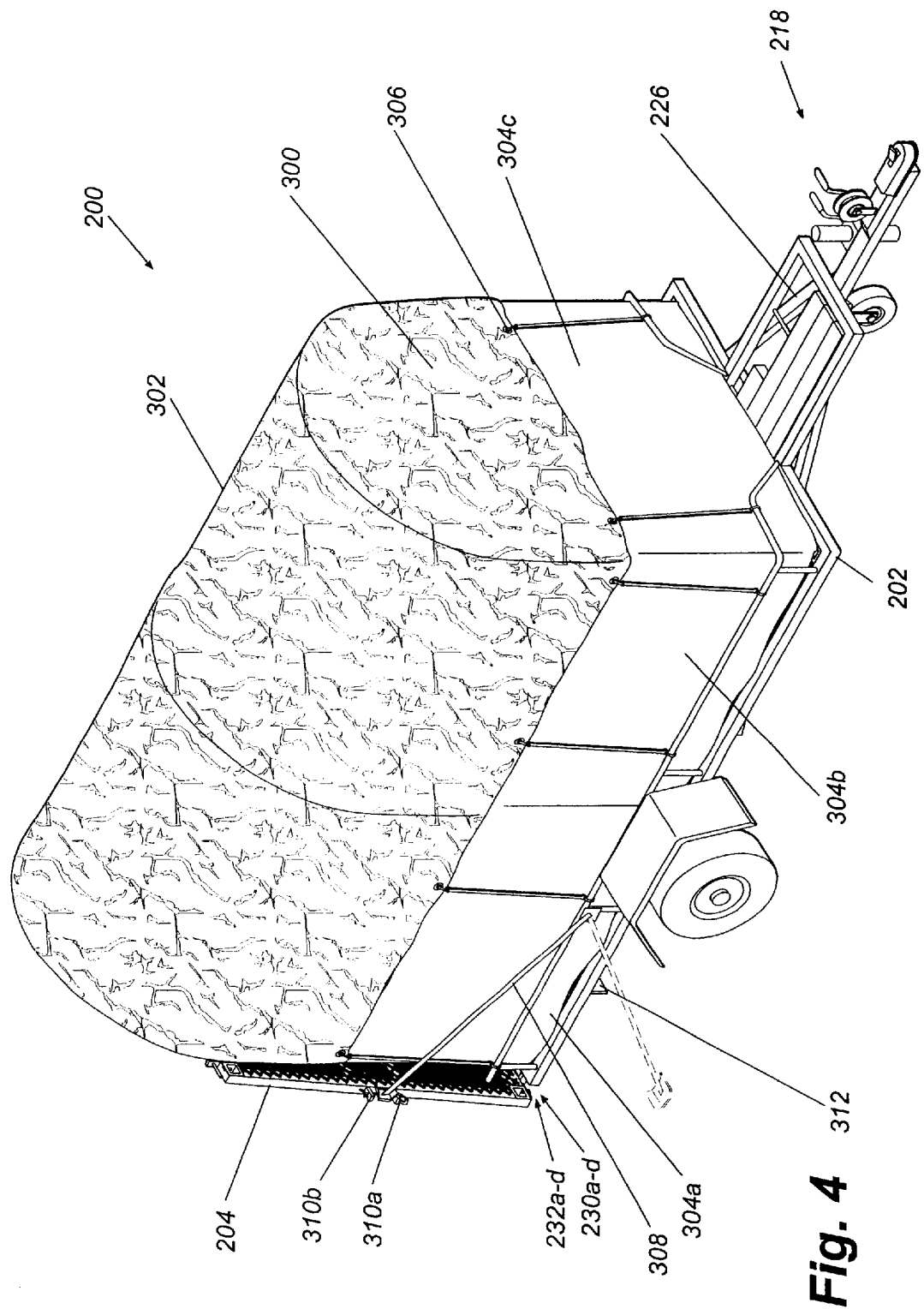
FIG. 4 is a perspective view of the SUT shown in a covered trailer mode.
Figure 5:
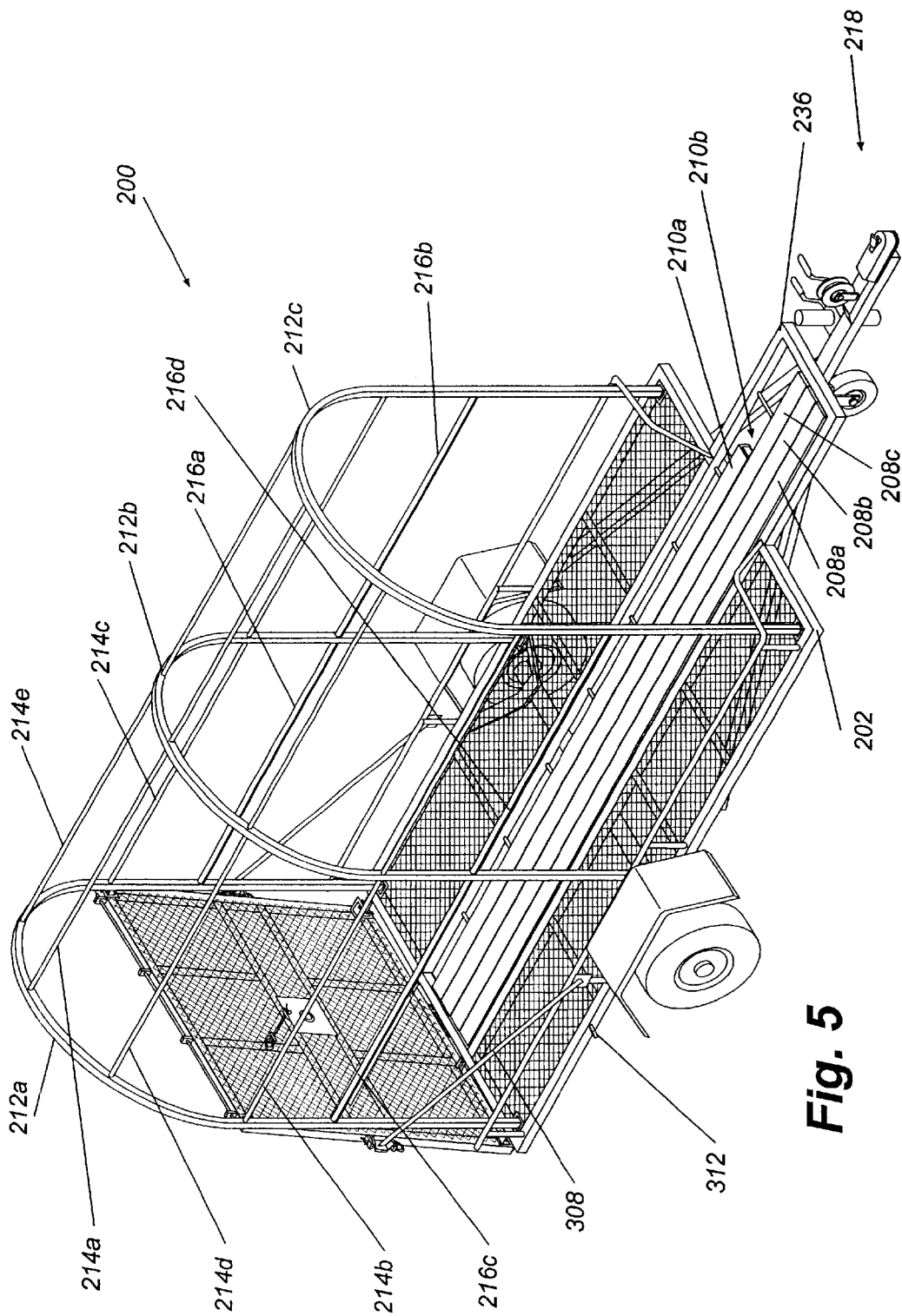
FIG. 5 is a perspective view of the SUT shown in an uncovered trailer mode.

FIGS. 4–5 show perspective views of the SUT 200 shown in FIG. 2 in the trailer mode. FIG. 4 is a view of the SUT 200 in a covered trailer mode. FIG. 5 is a view of the SUT 200 in an uncovered trailer mode. In the covered mode, the SUT 200 has a covered enclosure on top of a trailer. Furthermore, the SUT 200 can be used as a covered shelter for camping or for dry storage. While in either the covered or uncovered mode, the SUT 200 can be transported by towing the SUT 200 behind a conventional automobile or another type of vehicle, such as an ATV. Furthermore, the SUT 200 can be used to haul or carry items or equipment such as sporting equipment, motorbikes, an ATV, and the like.

The chassis covering 300 over the SUT 200 provides the SUT 200 with an amount of protection from environmental elements such as sun, wind, rain, and snow. The chassis covering 300 can be made into several different shaped pieces to achieve a better fit over the different sections of the SUT 200. For example, a large covering 302 can be shaped to fit over the arcuate portions of the bowed supports 212a–c, and several smaller rectangular coverings 304a–c can be made to fit on the sides of the bowed supports 212a–c and over the frontwall panel 206.

Typically, the chassis covering 300 ties down to the bowed supports 212a–c with spring cords, rope, or conventional plastic lock ties. Grommets 306 are sewn around the edges of the pieces of the chassis covering 300 to permit the cords, rope, or plastic lock ties to be threaded through each grommet 306 connected to the chassis frame 202. The chassis covering 300 can be removed from the bowed supports 212a–c and support rail by removing the cords, rope, or plastic lock ties so the chassis covering 300 falls away from the bowed supports 212a–c and the chassis frame 202.

The chassis covering 300 can be a waterproof or durable material that can be stretched over the top of the bowed supports 212a–c and around the sides of the SUT 200. The chassis covering 300 can be made from nylon, plastic, or canvas. Other materials may be selected for the chassis covering based upon the durability and versatility of the material. The chassis covering 300 can also be made from a material with a camouflage design to enhance its use for military or hunting applications.

The tailgate platform 204 is shown in the closed position relative to the rear end of the chassis frame 202. A tailgate lockbar 308 mounts on each side of the chassis frame 202, and swings upward and behind the tailgate platform 204 when the platform 204 is raised upright substantially perpendicular to the rear end of the chassis frame 202. When the rear edge of the tailgate platform 204 is raised upward from the ground position to the upright position, substantially perpendicular with respect to the top side of the chassis frame 202, the tailgate platform 204 is in the closed position. The tailgate lockbar 308 on the left and right side of the chassis frame 202 are positioned behind the tailgate platform 204 to secure the tailgate platform 204 in a closed position with respect to the chassis frame 202.

Lockbar brackets 310 on the sides of the tailgate platform 204 secure the lockbar 308 holding the platform 204 in an upright position. The lockbar brackets are further shown and described in FIGS. 12–14.

Typically, entry into the SUT 200 is made at the rear end of the chassis frame 202 with the tailgate platform 204. The tailgate platform 204 can be lowered by releasing the tailgate lock bars 308 mounted on both the left and right sides of the chassis frame 202 and swinging the rear edge of the tailgate platform 204 from an upright position to a ground position. The series of hinge plates 230a–d on the rear end of the chassis frame 202 cooperates with a series of hinge plates 232a–d on the front end of the tailgate platform 204 allowing the platform 204 to rotate with respect to the rear end of the frame 202. When the tailgate platform 204 is in the ground position, the platform 204 functions as a ramp into the rear of the SUT 200, thus permitting access into the rear of the chassis frame 202. The tailgate lockbar 308 functions as a frame stabilizer when the lockbar 308 is placed forward of a lockbar stop 312 mounted on the side of the chassis frame 202. The tailgate lockbar 308 and lockbar stop 312 are further described and shown in FIGS. 8–10.

The tongue assembly 218 is shown connected to the tongue guide 226 at the front end of the chassis frame 202. In this position, the tongue assembly 218 can be connected to a tow vehicle for towing the SUT 200. The tongue assembly 218 is further described and shown in FIGS. 15–17.

FIG. 5 illustrates a perspective view of the SUT 200 of FIG. 2 shown in an uncovered trailer mode. In this mode, the chassis covering 244 is removed from the SUT 200. Without a chassis covering 244, the view shows the details of the top side of the chassis frame 202. The bowed supports 212a–c and support struts 214a–e, 216a–d connect to the top side of the chassis frame 202, while the removable legs 208a–c and leg struts 210a–b are shown in the center portion of the chassis frame 202 within the recessed ladder 236.

Three removable legs 208a–c fit along the length of the recessed ladder 236 in the center portion of the chassis frame 202, parallel to the center axis 238 of the chassis frame 202. The removable legs 208a–c fit within the ladder 236 filling the space with the legs 208a–c of the ladder 236, creating a solid surface on the top side of the chassis frame 202. When the legs 208a–c are removed from the ladder 236, items smaller than the spacing in the ladder 236 may be prone to falling through the spaces. The removable legs 208a–c are tubular steel beams approximately 3"×1½" in dimension and approximately 10' in length. Other dimensions and materials for the legs 208a–c may be used depending upon the loading of the SUT 200 as an observation stand.

A removable rectangular-section leg strut 210a also fits into the length of the recessed ladder 236 in the central portion of the chassis frame 202. The leg strut 210a is a tubular steel beam approximately 3"×1½" in dimension and approximately 8' in length. The rectangular-section leg strut 210a supports the side legs 208b–c with respect to the chassis frame 202 when the SUT 200 is in the observation stand mode. Other dimensions and materials can be used for the rectangular-section leg strut 210a depending upon the loading of the SUT 200 as an observation stand.

A removable round-section leg strut 210b (shown in FIGS. 6–7) fits within the length of the rectangular-section leg strut 210a, and also fits into the length of the recessed ladder 236 in the central portion of the chassis frame 202. The leg strut 210b can be made from a tubular steel round bar approximately ¾" in diameter and approximately 8' in length. The round-section leg strut 210b supports the rear leg 208a with respect to the chassis frame 202 when the SUT 200 is in the observation stand mode. Other dimensions and materials can be used for the round-section leg strut 210b depending upon the loading of the SUT 200 as an observation stand.

Figure 7:
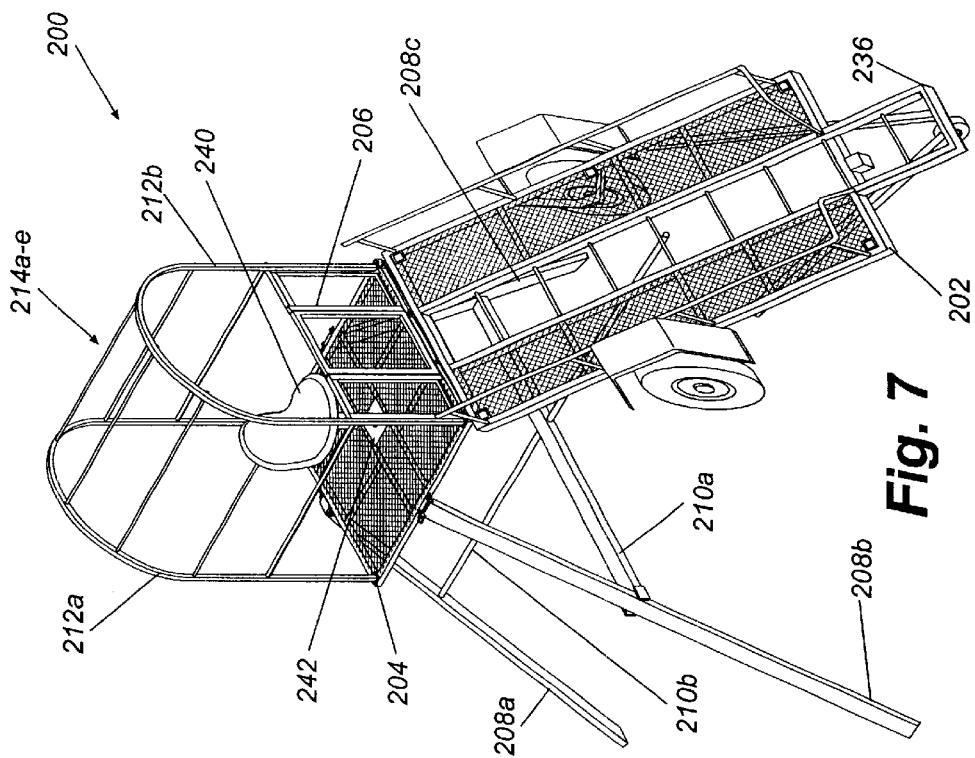
FIG. 7 is a perspective view of the SUT shown in an uncovered erected observation stand mode.
Figure 6:
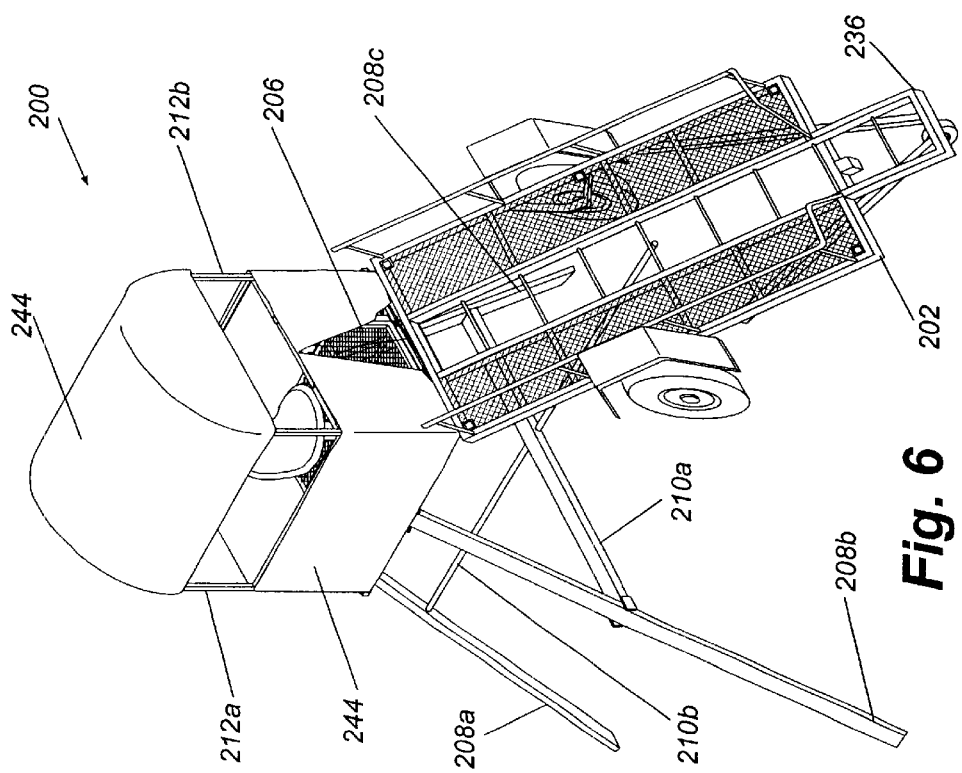
FIG. 6 is a perspective view of the SUT shown in a covered erected observation stand mode.

FIGS. 6–7 illustrate perspective views of the SUT 200 in FIG. 2 shown in an erected observation stand mode. FIG. 6 shows the SUT 200 in a covered erected observation stand mode. In this mode, the SUT 200 can be used as an above the ground platform, or observation stand. As an observation stand, the SUT 200 can be used for a variety of activities where the user desires a vantage point above the ground. Different types of activities may require use of a raised platform, including but not limited to hunting, viewing a car race, intelligence gathering, and the like. To gain a vantage point from above the ground using the SUT 200 as an observation stand, a user climbs the ladder 236 from the ground to the top side of the tailgate platform 204. The user can then enter the enclosure at the top of the tailgate platform 204 through the frontwall panel 206. Openings between the pieces of chassis covering 244 provide visual access for the user to see outside of the observation stand.

FIG. 7 shows the SUT 200 in an uncovered erected observation stand mode. In the uncovered observation stand mode, the chassis covering 244 is not installed over the SUT 200. Without the chassis covering 244, the view shows details of the platform enclosure. The frontwall panel 206 connects to the front edge of the tailgate platform 204 to provide or to restrict access to the platform enclosure of the observation stand. The bowed supports 212*a–b* connect to the top side of the platform 204 at the front edge and the rear edge of the platform. Support struts 214*a–e*, 216*a–d* connect between the bowed supports 212*a–c* to provide increased rigidity for the bowed supports 212*a–c*. The lower support struts 216*a–d* can be used for resting gun barrels upon when the observation stand is used for hunting. The swivel seat 240 mounts into the mounting plate 242 in the center portion of the tailgate platform 204. The swivel seat 242 provides the user with a place to sit or kneel while the user is on the observation stand.

Figure 8:
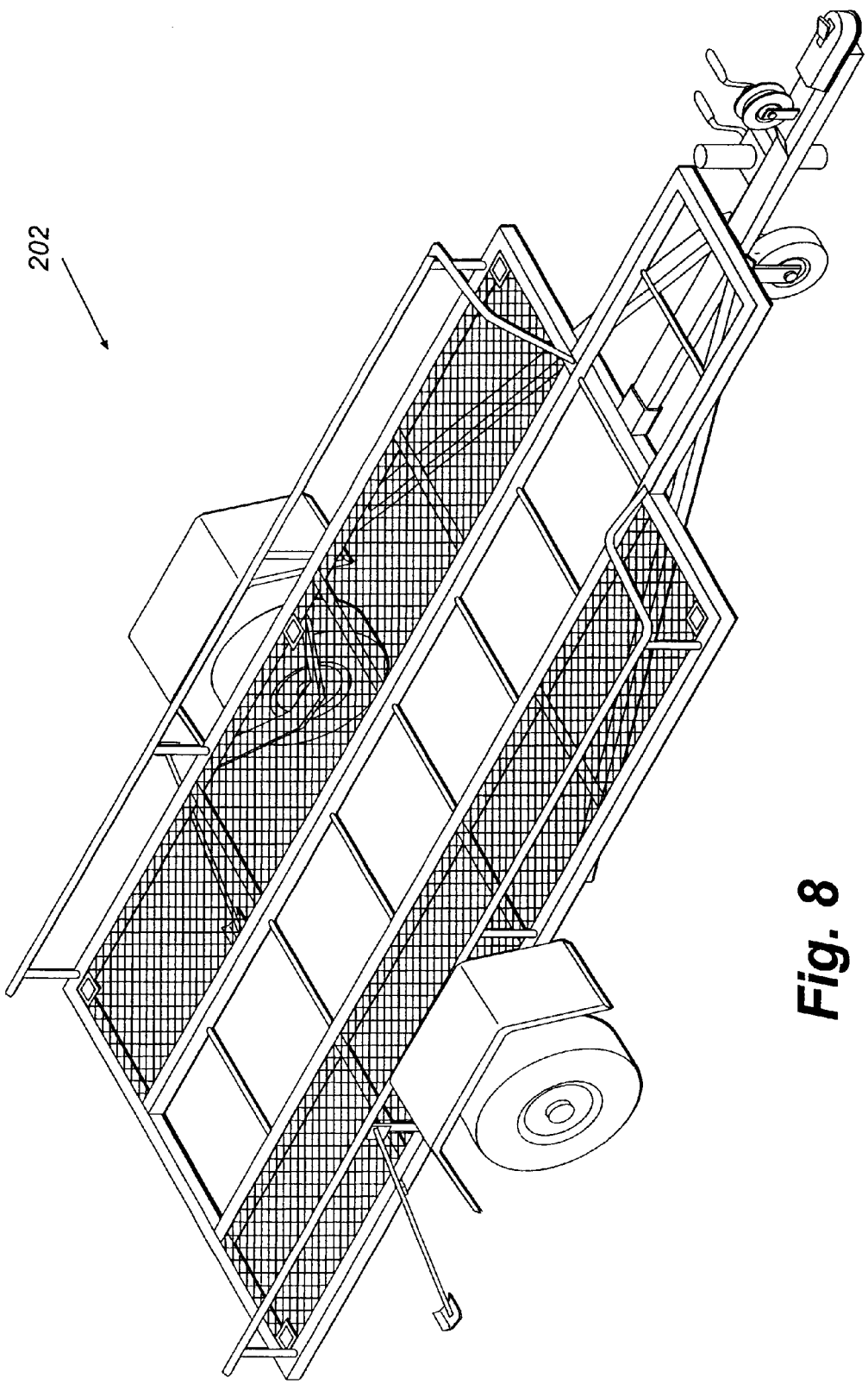
FIG. 8 is a perspective view of a chassis frame of the SUT shown in FIG. 2.

FIGS. 8–11 illustrate a chassis frame 202 of the SUT 200 shown in FIG. 2. FIG. 8 is a perspective view of the chassis frame 202. The chassis frame provides the vehicle base for the SUT 200 while the SUT 200 is in the trailer mode.

Figure 9:
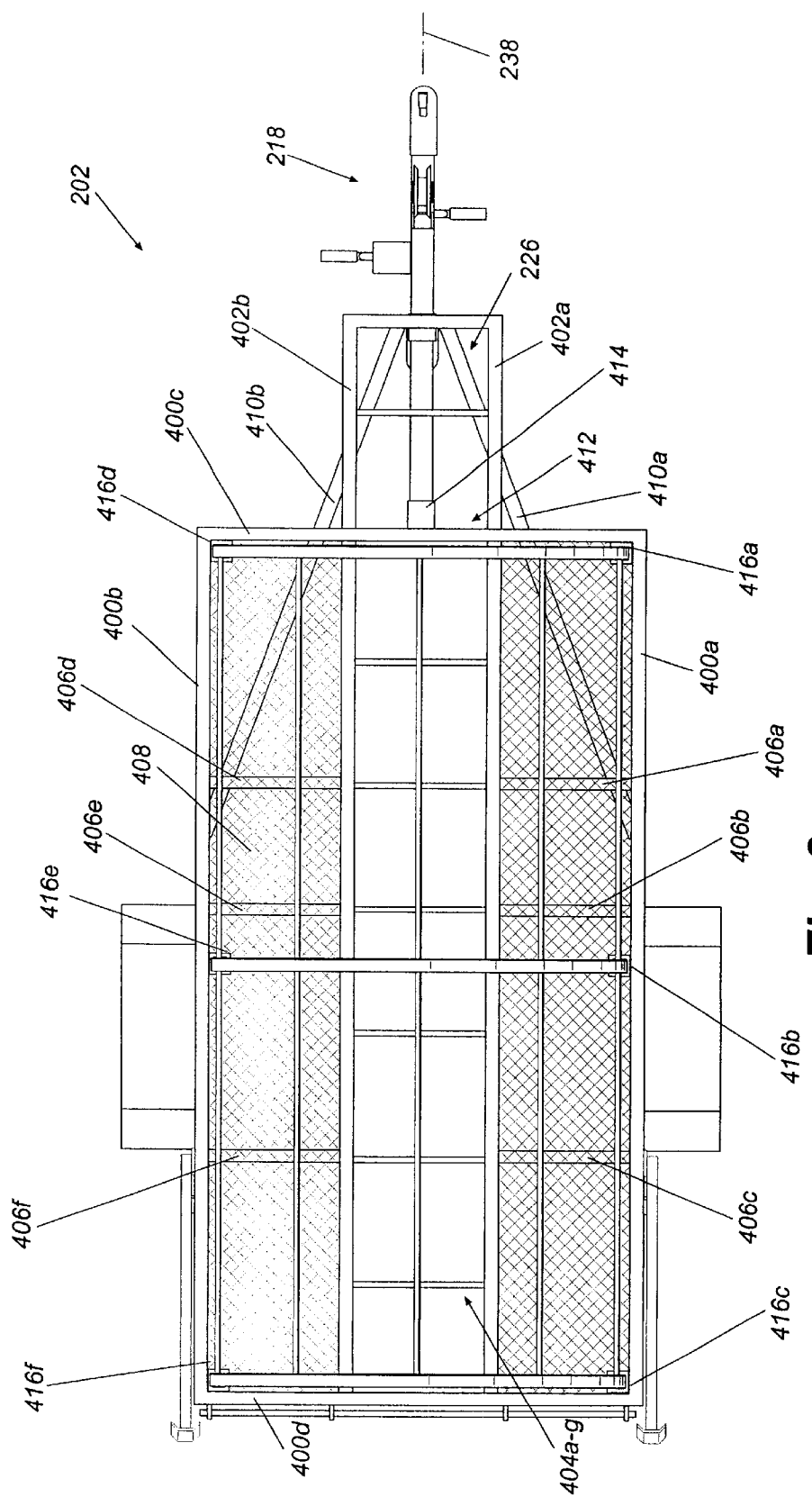
FIG. 9 is a top view of a chassis frame of the SUT shown in FIG. 5.
Figure 10:
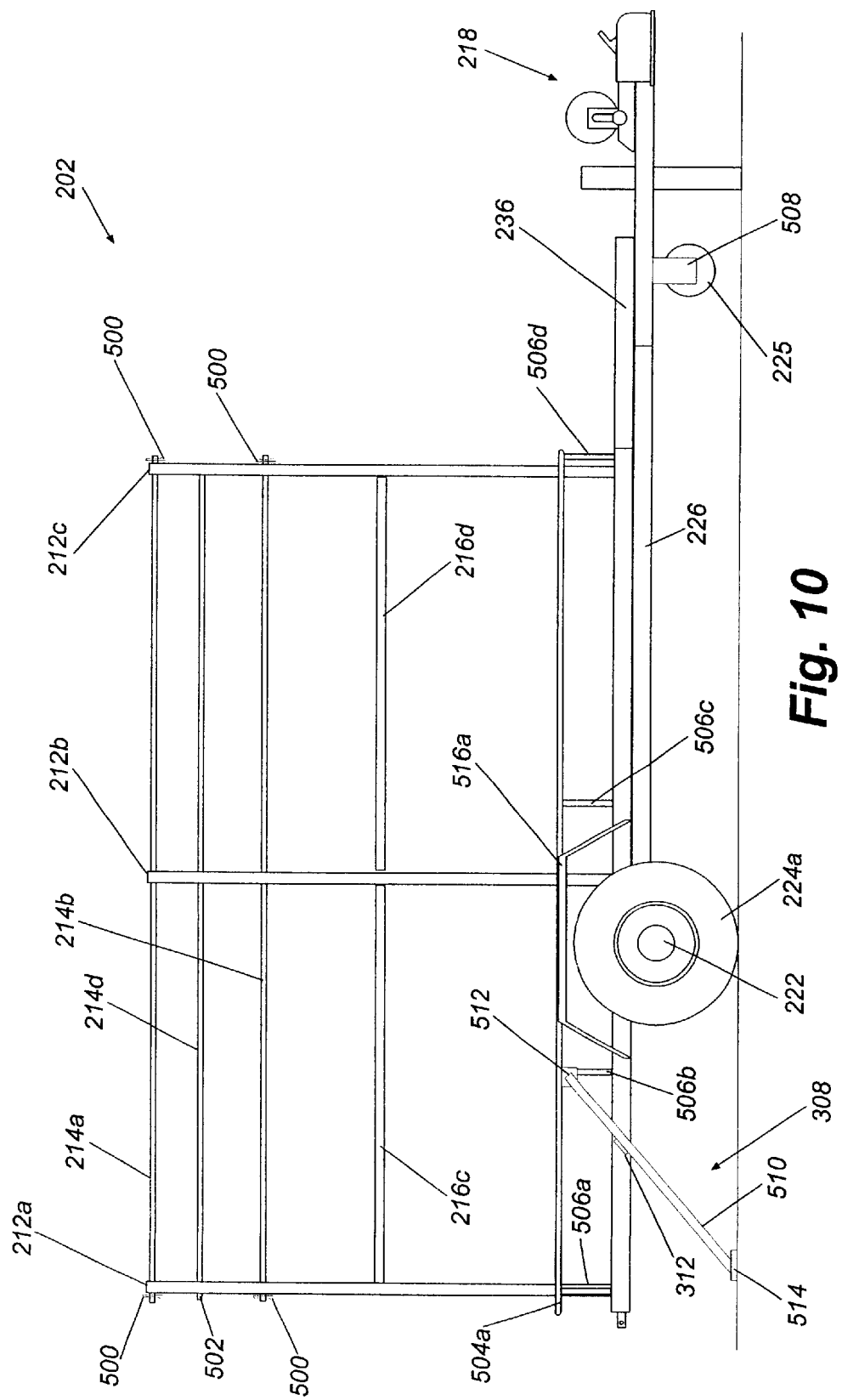
FIG. 10 is a side view of a chassis frame of the SUT shown in FIG. 5.
Figure 11:
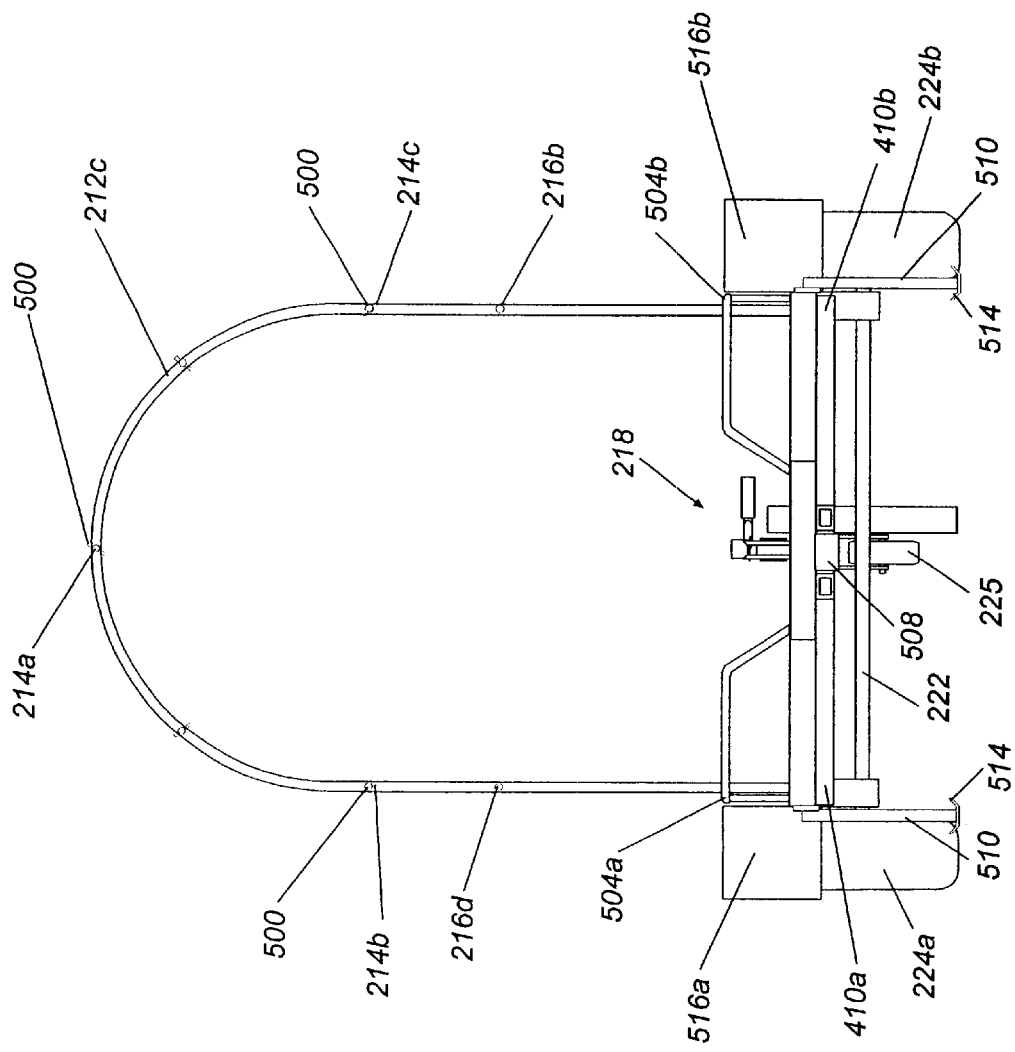
FIG. 11 is a front view of a chassis frame of the SUT shown in FIG. 5.

FIGS. 9–11 illustrate views of an uncovered chassis frame 202 of the SUT 200 in FIG. 5. FIG. 9 is a top view of the chassis frame 202. The chassis frame 202 is a rectangular-shaped steel frame that includes four C-shape 11 gauge steel channels approximately 2"×2" in dimension to form the exterior sides 400*a–d* of the frame 202. Exterior side channels 400*a–b* extend lengthwise along the left and right sides of the chassis frame. The exterior side channels 400*a–b* are approximately 97" in length. Exterior end channels 400*c–d* extend widthwise across the front and rear ends of the chassis frame 202. The exterior end channels 400*c–d* are approximately 50" in length. Corresponding ends of the exterior side 400*a–b* and end channels 400*c–d* fit together to form the rectangular-shaped frame 202. Conventional A36 steel material or any other similar material can be used for the steel components of the sports utility trailer. Other grades of steel or different types of materials can be selected depending upon the loads to be supported by the chassis frame 202 while the SUT 200 is in a trailer mode, and by the loads to be supported by the tailgate platform 204 while the SUT 200 is in an observation stand mode. Conventional welding materials used in accordance with conventional welding practices are used to attach the steel components together.

The ladder 236 provides the center lengthwise portion of the chassis frame 202 while the SUT 200 is in trailer mode, and further provides manual access to the platform 204 when the platform 204 is raised above the ground. The ladder 236 integrates into the chassis frame 202 and positions lengthwise in the center portion of the frame 202. Two L-shape 11 gauge steel angles approximately 2"×2" in dimension and approximately 10' in length form the legs 402*a–b* of the ladder 236. The legs 402*a–b* are made from L-shaped angles that are positioned so that the top side of the ladder 236 forms a recess in the top side of the chassis frame 202. Rungs 404*a–g* for the ladder 236 are formed by pieces of reinforced steel bar approximately ½" diameter and approximately 12" in length spaced apart between the ladder legs 402*a–b* along the length of the ladder 236. The ladder legs 402*a–b* extend from the rear end of the chassis frame 202 to a distance of approximately 23" past the front end of the frame 202. Conventional welding materials used in accordance with conventional welding practices are used to attach the rear ends of the ladder legs 402*a–b* to the end channels 400*c–d* of the frame 202, and to attach the rungs 404*a–g* to the ladder legs 402*a–b*.

The length of the rungs 404*a–g* depends upon the distance between the legs 402*a–b* of the ladder 236. Spacing between the rungs 404*a–g* depends upon the comfortable ladder step reach of a user. The rung 404*a–g* spacing is approximately 12" between each ladder rung 404*a–g*. The material, size, and length of reinforced steel bar used for the ladder rungs 404*a–g* can be selected by consideration of the maximum load to be supported by each rung 404*a–g*.

Cross-members 406*a–f* provide structural support between the sides of the chassis frame 202 and the ladder legs 402*a–b*. Cross-members 406*a–f* extend between each ladder leg 402*a–b* and the exterior side channels 400*a–b* extending along both sides of the chassis frame 202. Three cross-members 406*a–c* extend between the left exterior side channel 400*a* and the left ladder leg 402*a*, and are oriented substantially parallel with the front exterior end channel 400*c* and rear exterior end channel 400*d*. Hereinafter, the three cross-members 406*a–c* on the left side of the chassis frame 202 will be referred to from front to rear of the chassis frame as the left front cross-member 406*a*, the left center cross-member 406*b*, and the left rear cross-member 406*c*. Similarly, three cross-members 406*d–f* extend between the right exterior side channel 400*b* and the right ladder leg 402*b*, and are also are oriented substantially parallel with the front exterior end channel 400*c* and rear exterior end channel 400*d*. Hereinafter, the three cross-members 406*d–f* on the right side of the chassis frame 202 will be referred to from front to rear of the chassis frame 202 as the right front cross-member 406*d*, the right center cross-member 406*e*, and the right rear cross-member 406*f*. Each cross-member is an L-shape 2"×2" 11 gauge steel angle approximately 18" in length. Conventional welding materials used in accordance with conventional welding practices are used to attach the ends of the cross-members 406*a–f* to the ladder legs 402*a–b* and to the exterior side channels 400*a–b*.

Steel wire mesh 408 fills in the spaces between the side exterior channels of the chassis frame 202 and the ladder legs 402*a–b*. The wire mesh 408 attaches to the top side of the chassis frame 202 to provide a durable covering for the frame 202. Two rectangular shaped portions of wire mesh 408 cover the chassis frame 202 between the ladder legs 402*a–b* and the exterior side channels 400*a–b*. The first portion of wire mesh 408 extends from the left exterior side channel 400*a* to the left ladder leg 402*a*, and extends the length of the chassis frame 202. The second portion of wire mesh 408 extends from the right exterior side channel 400*b* to the right ladder leg 402*b*, and extends the length of the chassis frame 202. Conventional welding materials used in accordance with conventional welding practices are used to attach the steel wire mesh 408 to the exterior side channels 400*a–b*, the exterior end channels 400*c–d*, the cross-members 406*a–f*, and the ladder legs 402*a–b*.

The tongue guide 226 functions as a towing appendage for the chassis frame 202. The tongue guide 226 includes two tongue guide channels 410a–b and a tongue guide support strut 412. Each tongue guide channel 410a–b is a U-shaped 11 gauge steel channel approximately 2"×2" in dimension and approximately 60" in length. One end of each tongue guide channel 410a–b attaches to the bottom side of the chassis frame 202, the end of the left guide channel 410a attaches to the left side of the frame 202 near the front end of the frame 202, and the end of the right guide channel 410b attaches at the right side of the frame 202 near the front end of the frame 202. The opposing ends of each tongue guide channel 410a–b intersect each other near the center axis 238 of the chassis frame 202 at the front end of the ladder legs 402a–b.

A tongue guide support strut 412 strengthens the attachment of the tongue guide 226 to the chassis frame 202, and provides a mount for the tongue assembly 218 to connect with the tongue guide 226. The tongue guide support strut 412 extends between the two tongue guide channels 410a–b near the center portion of each guide channel 410a–b. The tongue guide support strut 412 is substantially parallel with the front end of the chassis frame 202, and attaches to the front exterior end channel 400c of the frame 202. A tongue guide support strut 412 is an L-shaped 11 gauge steel angle approximately 2"×2" in dimension and approximately 20" in length. The ends of the tongue guide support strut 412 connect to the sides of the two tongue guide channels 410a–b, and the top of the strut 412 connects to the bottom side of the front exterior end channel 400c of the chassis frame 202.

The tongue guide support strut 412 has a square receiving end 414 welded at the center portion of the front side of the strut 412 facing towards the front ends of the tongue guide channels 410a–b. The square receiving end 414 is sized to receive the removable tongue assembly 218. The tongue assembly 218 is further shown and described in FIGS. 15–17. The square receiving end 414 is a square tubular steel beam section approximately 2½"×2½" in dimension and approximately 3" in length. A lockpin (not shown) mounted in a hole machined in the side of the square receiving end 414 secures the tongue assembly 218 when the tongue assembly 218 is mounted within the square receiving end 414.

To mount the bowed supports 212a–c to the top side of the chassis frame 202 as shown in FIGS. 10–11, square tubular sections 416a–f approximately 1"×1" and approximately 2" in length mount to the interior sides of the left exterior side channel 400a and the right exterior side channel 400b. The ends of the bowed supports 212a–c install into the tubular sections 416a–f to span across the left and right exterior side channels. The tubular sections 416a–f are sized to receive the ends of the bowed supports 212a–c so that the bowed supports 212a–c fit into the tubular sections 416a–f permitting the bowed supports 212a–c to stand upright substantially perpendicular to the chassis frame 202.

A lock bolt (not shown) mounts into a corresponding bolt hole machined in the side of each square tubular section 416a–f. The lock bolt can be tightened within the bolt hole when a bowed support 212a–c is mounted within the square tubular section 416a–f until the lock bolt holds the bowed support 212a–c within the square tubular section 416a–f.

For the front bowed support 212c, a first tubular section 416a mounts in the interior corner where the front exterior end channel 400c and the left exterior side channel 400a intersect, and a second tubular section 416b mounts in the interior corner where the right exterior side channel 400b and the front exterior end channel 400c intersect. When required, the front bowed support 212c can be inserted and removed from the tubular sections 416a–b.

For the center bowed support 212b, a first tubular section 416c mounts in the front interior corner where the left center cross-member 406b intersects with the left exterior side channel 400a, and a second tubular section 416d mounts in the front interior corner where the right center cross-member 406e and the right exterior side channel 400b intersect. When required, the center bowed support 212b can be inserted and removed from the tubular sections 416c–d.

For the rear bowed support 212a, a first tubular section 416e mounts in the interior corner where the rear exterior end channel 400d and the left exterior side channel 400a intersect, and a second tubular section 416f mounts in the interior corner where the right exterior side channel 400b and the rear exterior end channel 400d intersect. When required, the rear bowed support 212a can be inserted and removed from the tubular section 416e–f.

FIG. 10 is a side view of a chassis frame 202 of the SUT 200 shown in FIG. 8. FIG. 11 is a front view of a chassis frame 202 of the SUT 200 shown in FIG. 8. Three bowed supports 212a–c are shown installed on the top side of the chassis frame 202 in FIGS. 10–11. The bowed supports 212a–c extend upward from the top of the chassis frame 202 and substantially perpendicular to the top side of the frame 202. The bowed supports 212a–c are spaced along the length of the chassis frame 202 from the rear end of the chassis frame 202 to the front end. As shown in FIG. 11, each bowed support 212a–c spans the width of the chassis frame 202 from the left side to the right side of the frame 202. The bowed supports 212a–c are square tubular steel beams approximately 1"×1" in dimension and approximately 176" in length. The steel beams are formed into a U-shape. From the top of the arcuate portion of each bowed support, the horizontal height of each bowed support is approximately 74". The width of each bowed support from one side to the opposing side is approximately 48".

To mount the bowed supports 212a–c upright with respect to the chassis frame 202, the ends of each bowed support 212a–c insert into the square tubular sections 416a–f welded onto the chassis frame 202 as shown in FIGS. 8–9. The tubular sections 416a–f are sized to support the bowed supports 212a–c in an upright position, substantially perpendicular to the top side of the chassis frame 202. The lock bolt (not shown) on the side of each tubular section 416a–f can be tightened within. the bolt hole when a bowed support 212a–c is mounted within the tubular section 416a–f until the lock bolt holds the bowed support 212a–c within the tubular section 416a–f.

Support struts 214a–e, 216a–d are spaced between the bowed supports 212a–c and parallel with the center axis 238 of the chassis frame 202. The support struts 214a–e, 216a–d provide spacing between the bowed supports 212a–c and provide additional rigidity to the bowed supports 212a–c. The support struts 214a–e, 216a–d include long support struts 214a–c, knobbed support struts 214d–e, and short support struts 216a–d.

Any number of support struts 214a–e, 216a–d can be used with a SUT. Any type of different strut or a different configuration of support struts or configuration of support to provide spacing between the bowed supports 212a–c apart and to provide additional rigidity for the bowed supports 212a–c.

Three long support struts 214a–c are positioned between the arcuate portions of the bowed supports 212a–c. The first long strut 214a is positioned at the top of the bowed supports 212a–c. The other two long struts 214b–c are located through the bowed supports 212a–c at a position approximately 60 degrees downward on either side of a vertical plane through the center axis 238 of the chassis frame 202. The long support struts 214a–c are round steel bars approximately ½" in diameter and approximately 95" in length. Beginning from the rear bowed support 212a, the long support struts 214a–c are positioned through approximately ½" diameter holes machined into the front and rear faces of each of the three bowed supports 212a–c. Each long support strut 214a–c passes through the corresponding holes of each of the three bowed supports 212a–c until all three bowed supports 212a–c are connected with each long support strut 214a–c.

A pin hole (not shown) is machined into the ends of each long support strut 214a–c to receive a strut pin 500. When the strut pin 500 is inserted into the hole at the end of the support strut 214a–c, the strut pin 500 secures the support strut 214a–c into position between the bowed supports 212a–c. A strut pin 500 can be a conventional cotter pin, or any other type of pin. Other devices or structures can be used to secure the long support struts 214a–c relative to the positions of the bowed supports 212a–c.

Two knobbed support struts 214d–e are positioned between the upper long support strut 214a and between each of the lower long support struts 214b–c. The knobbed support struts 214d–e are positioned at approximately 30 degrees downward from a vertical plane passing through the center axis 238 of the chassis frame 202. Each knobbed strut 214d–e has a knob 502 at the rear end of the strut 214d–e. The knob 502 is relatively larger than the holes machined in the bowed supports 212a–c.

Beginning at the rear bowed support 212a, the knobbed struts 214d–e are inserted into holes machined into the rear face of the rear bowed support 212a. The knobbed struts 214d–e are pulled through a corresponding hole in the front face of the rear bowed support 212a, then through corresponding holes in the rear and front face of the center bowed support 212b, and then inserted into a corresponding hole in the rear face of the front bowed support 212a. Unlike the long support struts 214a–c, the knobbed struts 214d–e are not pulled through holes machined in the front face of the front bowed support 212c. Holes are not drilled through the front face of the front bowed support 212c to receive the knobbed struts 214d–e. The knobbed struts 214d–e are sized in length so that the knob 502 will be flush with the rear side of the rear bowed support when the front end of the knobbed strut 214d–e is firmly within the hole of the front bowed support 212c. The knobbed support struts 214d–e are steel round bars approximately ½" in diameter and approximately 95½" in length.

Four adjustable short support struts 216a–d are positioned at the intersection of the arcuate portions of the bowed supports 212a–c and the straight portions of the bowed supports 212a–c. Each short support strut 216a–d fits between a pair of bowed supports 212a–c parallel with the center axis 238 of the chassis frame 202. The short support struts 216a–d are approximately half the length of the long support struts 214a–c and the knobbed support struts 214d–e. The bowed supports 212a–c have holes machined into the rear and front faces of the supports 212a–c to receive the short struts 216a–d. Each end of the short struts 216a–d has a machined notch at the end sized to fit snugly into a series of machined holes in the front faces of the rear bowed support 212a and the center bowed support 212b, and in the rear faces of the center bowed support 212b and the front bowed support 212c. The short support struts 216a–d are steel round bars approximately ½" in diameter and approximately 46¾"" in length.

A substantial portion of the short support struts 216a–d can have a rubber jacket or plasticized coating to prevent metal-to-metal contact with a gun barrel when a gun barrel is rested on top of the short strut 216a–d. Such a jacket or coating is useful when the short struts 216a–d are used in the observation stand and the user wants to rest a gun, rifle, or any other device on the short strut 216a–d. Other types of coatings or jackets can be placed on the short support struts 216a–d to prevent metal-to-metal contact between a metal object and the short support strut 216a–d.

As shown in FIGS. 10–11, curved support rails 504a–b provide the SUT 200 with a railing along the sides of the chassis frame 202, and also provide handrails to assist a user in climbing or ascending the ladder 236 of the SUT 200 in an observation stand mode. One section of the curved support rails 504a–b extends along the left side of the chassis frame 202 from the rear end of the frame 202 to the front end of the frame 202. Likewise, a second section of the curved support rails 504a–b extends along the right side of the chassis frame 202 from the rear end of the frame 202 to the front end of the frame 202. At the front end of the frame 202, the support rails 504a–b bend at approximately a 90 degree angle extending a short distance along the front end of the frame 202 before bending downward towards the front end of the frame 202, and terminating near the center portion of the frame 202. A curved support rail 504a–b is a steel round bar approximately 1" in diameter and approximately 127" in length.

The curved support rails 504a–b are supported above the edges of the frame 202 by flat bar supports 506a–h approximately 1"×¼" in dimension and approximately 9" in length. The flat bar supports 506a–h are spaced apart along the length of the chassis frame 202, and are positioned substantially perpendicular to the chassis frame 202. The flat bar supports 506a–h extend from the bottom side of the curved support rails 504a–b to the top side of the chassis frame 202. The flat bar supports 506a–h are welded to the bottom side of each curved support rail 504a–b, and further welded to the top side of the chassis frame 202, thus attaching the curved support rails 504a–b to the chassis frame 202.

As shown in FIGS. 8–11, rear wheels 224a–b attach to an axle 222 mounted on the bottom of the chassis frame 202, and a front guide wheel 225 mounts on the front end of the tongue guide 226 to support the chassis frame 202 above the ground while the SUT 200 is in the trailer mode. The two rear wheels 224a–b are designed to support the chassis frame 202 and a load upon the chassis frame while the SUT 200 is being towed or transported in the trailer mode. The rear wheels 224a–b mount to the bottom side of the chassis frame 202 by a conventional suspension assembly (not shown) and an axle 222. The conventional suspension assembly supports the axle 222 beneath the chassis frame 202 so that the axle 222 is positioned substantially perpendicular with the center axis 238 of the frame 202.

The axle 222 is positioned towards the rear portion of the chassis frame 202 with the ends of the axle 222 extending from the left side and the right side of the chassis frame 202. Dimensions of the axle 222 can be selected based upon the loading capacity of the structural components of the SUT 200. A suitable axle 222 for the SUT 200 is a 2,000 lb. axle with a 2,500 lb. maximum load capability.

A rear wheel 224a–b attaches to each of the opposing ends of the axle 222. The dimensions of the rear wheels 224a–b are selected to be compatible with the axle 222 and further sized to handle the loading capacity of the SUT 200. A suitable rear wheel 224a–b for the SUT 200 is a Model 4.80-12 tire made by CHEROKEE capable of supporting 980 lb.

A single front guide wheel 225 is designed to support the front end of the chassis frame 202 when the SUT 200 is detached from the tow vehicle. The front guide wheel 225 provides stabilization of the chassis frame 202, and assists in manually maneuvering the SUT 200 while in the trailer mode and detached from the tow vehicle. When the SUT 200 attaches to the tow vehicle with the tongue assembly 218, the front guide wheel 225 lifts off of the ground so that the front end of the SUT 200 is supported by the tongue assembly 218 and the tow vehicle.

The front guide wheel 225 mounts to the front end of the tongue guide 226 with a wheel bracket 508 supported on the bottom side of the front end of the tongue guide 226. The wheel bracket 508 is positioned near the intersection of the front ends of the tongue guide channels 410a–b. The wheel bracket 508 holds the front guide wheel 225 substantially parallel with a vertical plane passing through the center axis 238 of the chassis frame 202. A suitable front guide wheel 225 for the SUT 200 has a 850 lb. capacity, such as Model 5756A manufactured by Shelby Industries, Inc. of Shelbyville, Ky.

As previously described, the tailgate lockbar 308 can be used to secure the tailgate platform 204 in a relatively upright position. The lockbar 308 mounts within lockbar brackets 310a–b on the sides of the tailgate platform 204 to support the platform substantially perpendicular with the chassis frame 202. Furthermore, the tailgate lockbar 308 can also be used as a stabilizer for the chassis frame 202. When the tailgate lockbar 308 is released from the lockbar brackets 310a–b, the lockbar can be secured behind the lock bar stop 312 on the chassis frame 202.

The tailgate lockbar 308 is located on the outboard sides of curved support rails 416a–b of the chassis frame 202 behind the rear wheels 224a–b. The tailgate lockbar 308 includes a body 510, a pivot pin 512, and a foot plate 514. The body 308 attaches to the outboard side of the curved support rail 416a–b with the pivot pin 512. The body is a 11 gauge steel L-shaped angle approximately 1"×½" in dimension and approximately 34" in length. The pivot pin 512 passes through a hole machined at one end of the body 510, and then passes through a hole machined in the outboard side of the exterior channel of the frame 202. The pivot pin 512 is a ¼" bolt approximately 1¼" in length. The pivot pin 512 secures to the frame 202 with a lock nut. The foot plate 514 attaches to the opposing end of the tailgate lockbar 308 such that the body 510 mounts substantially perpendicular to the foot plate 514. The foot plate is a piece of 11 gauge L-shape 3" channel approximately 4" in length. The pivot pin 512 is pivotally hinged to the curved support rail 416a–b such that the tailgate lockbar 308 can swing from a locked position positioning the tailgate platform 204 upright with respect to the chassis frame 202, to an unlocked position where the lockbar 308 is not restrained and the tailgate platform 204 can be opened with respect to the chassis frame 202, to a second locked position where the foot plate 514 is flush with the ground and chassis frame 202 cannot roll freely on the wheels 224a–b, 225 without encountering relatively greater frictional resistance by the foot plate 514.

Lockbar stops 312 for the tailgate lockbar 308 provide a positive stop for the swing of the tailgate lockbar 308 when the tailgate lockbar 308 is disengaged from the lockbar brackets 310a–b and the tailgate lockbar 308 is moved to the ground position. Lockbar stops 312 are made from a piece of angle steel approximately 1"×1" in dimension and approximately 1" in length. The lockbar stops 312 are welded to the outboard sides of the left exterior side channel 400a and the right exterior side channel 400b of the chassis frame 202. The user swings the tailgate lockbar 308 downward from the lockbar brackets 310a–b of the tailgate platform 204, pulls the tailgate lock bar outward from the side of the chassis frame 202, and swings the tailgate lockbar 308 in front of the lockbar stop 312 so that the tailgate lockbar 308 is forward of the lockbar stop 312.

When the tailgate lockbars 308 are in a locking position between the lockbar brackets 310a–b, the tailgate lockbars 308 support the tailgate platform 204 in a substantially upright position and prevents the tailgate platform 204 from swinging downward to an open position. In the alternative, when the tailgate lockbar 308 is in an unlocked position and placed in front of the lockbar stop 312, the tailgate lockbar 308 provides stabilization of the chassis frame 202 when the foot plate 514 is flush with the ground. In this position, the tailgate lockbar 308 provides relatively greater resistance to any movement of the chassis frame 202 from rolling backward or forward on the rear wheels 224a–b.

Conventional mud guards 516a–b attach to the chassis frame 202 over the rear wheels 224a–b to provide protection from flying mud or debris kicked up from the rear wheels 224a–b. The mud guards 516a–b connect to the exterior side channels 400a–b of the chassis frame 202 over the top portion of the circumference of the rear wheels 224a–b. Each mud guard 516a–b has a flat center portion that remains substantially parallel with the chassis frame 202. A front and rear portion of each mud guard 516a–b curves slightly downward from each end of the center portion towards the ground. The mud guards 516a–b are made from relatively light gauge steel, or a durable plastic material.

Conventional brake lighting (not shown) can be located behind the mud guards. A conduit (not shown) for the electrical wiring extends along the bottom side of the rearmost interior cross-member 406c,f inward towards the ladder beams 402a–b. The conduit then extends along the bottom side of the ladder beams 402a–b forward to the front exterior end channel 400c of the chassis frame 202. The conduit extends forward to the front end of the tongue guide 226, permitting user access to the conduit. Electrical wiring (not shown) can be pulled through the conduit between the brake lights of the SUT 200 and the front end of the tongue guide 226 to connect to the brake lighting. The electrical wiring can then connect to suitable electrical connections for the brake lighting of the tow vehicle.

The tongue assembly 218 is shown attached to the front end of the tongue guide 226. The tongue assembly 218 inserts into a square tongue bracket 518 above the front guide wheel, so that the end of the tongue assembly fits into the square receiving end 414 mounted on the tongue guide support strut 412 of the tongue guide 226. The lockbolt (not shown) can be mounted in the hole machined in the side of the square receiving end 414 to secure the tongue assembly 218 within the square receiving end 414. The tongue assembly 218 is further shown and described in FIGS. 15–17.

FIGS. 12–14 illustrate a tailgate platform 204 for the SUT 200 shown in FIG. 2. FIG. 12 is a top view of a tailgate platform 204 shown in FIG. 2. FIG. 13 illustrates a front view of a tailgate platform 204 shown in FIG. 12. The tailgate platform 204 is a rectangular-shaped section which includes four exterior side channels 600a–d, two interior channel members 602*a–b,* four interior cross-members 604*a–d,* and four square tubular steel sections 606*a–d.* The square tubular sections 606*a–d* are oriented at the corners of the tailgate platform 204 to receive the ends of the bowed supports 212*a–c.* The exterior side channels 600*a–d* are positioned between the square tubular sections 606*a–d* to form the outer rectangular shape of the tailgate platform 204.

The front edge of the tailgate platform 204 is formed by the front exterior side channel 600*a.* A corresponding rear exterior side channel 600*b* forms the rear edge of the tailgate platform 204, or the top of edge of the tailgate platform 204 when the platform 204 is in an upright position relative to the chassis frame 202. A left exterior side channel 600*c* and a right exterior side channel 600*d* complete the rectangular-shape of the tailgate platform 204. The ends of the exterior side channels 600*a–d* connect to the sides of the square tubular sections 606*a–d* using conventional welding materials used in accordance with conventional welding procedures. The front exterior side channel 600*a* and rear exterior side channel 600*b* are made from L-shape 11 gauge steel angles approximately 2"×1½" in dimension and approximately 48" in length. The left exterior side channel 600*c* and right exterior side channel 600*d* are made from L-shape 11 gauge steel angles approximately 2"×1½" in dimension and approximately 48" in length. Other dimensions or types of material may be used depending upon the loading of the tailgate platform 204.

The interior channel members 602*a–b* are positioned parallel with the front edge of the tailgate platform 204 and spaced apart across the center portion of the platform 204. The interior channel members 602*a–b* are spaced apart approximately 8" from each other, with the front interior channel member 602*a* spaced approximately 18" from the front exterior side channel 600*a,* and the rear interior channel member 602*b* spaced approximately 18" from rear exterior side channel 600*b.* The interior channel members 602*a–b* are made from L-shape 11 gauge steel angles approximately 2"×1½" in dimension and approximately 44 in length.

Two pairs of cross-members 604*a–d* are positioned perpendicular with the interior channel members 602*a–b* and parallel with the plane of the rectangular-shaped tailgate platform 204. A single pair of cross-members 604*a–b* is located between the front exterior side channel 600*a* and the front interior channel member 602*a.* A second pair of cross-members 604*c–d* is located between the rear exterior channel member 600*b* and the rear interior channel member 602*b.* The cross members 604*a–b* between the front exterior side channel 600*a* and the front interior channel member 602*a* are spaced apart approximately 15" from each other, with each cross member 604*a–b* spaced approximately 15" from the exterior side channels 600*c–d.* The cross-members 604*c–d* between the rear exterior side channel 600*b* and the rear interior channel member 602*b* are spaced apart approximately 15" from each other, with each cross member 604*c–d* spaced approximately 15" from the exterior side channels 600*c–d.* The cross-members 604*a–d* are made from L-shape 11 gauge steel angles approximately 2"×1½" in dimension and approximately 44" in length.

A swivel seat 240 can be installed into the tailgate platform 204 for use as a chair when the SUT 200 is in the observation stand mode. A user can sit down or kneel on the swivel seat 240 while using the SUT 200 as an observation stand. A seat mounting plate 242 mounts between the interior channel members 602*a–b* in the center portion of the tailgate platform 204. The seat mounting plate 242 is made from a square flat steel plate approximately 8"×8" in dimension and approximately ⅛" thick with a hole in the center portion. The hole is sized to receive a swivel seat mounting post (not shown). The plate 242 attaches to the interior channel members 602*a–b* with bolts through a series of bolt holes in the plate 242 corresponding with bolt holes through the center portions of the interior channel members 602*a–b.* Corresponding nuts tighten the bolts down to fasten the steel plate 242 to the interior channel members 602*a–b.*

Typically, the swivel seat 240 is a chair attached to a swivel seat mounting post (not shown). When the swivel seat post is mounted into the center hole, the swivel seat 240 is positioned above the top side of the tailgate platform 204. A suitable swivel seat 240 is a bass boat chair sold under the mark Swivl-eze® Marine manufactured by the Wise Company, a Zebco, Inc. division in Lancaster, Tex. The mounting plate 242 can be used to mount other devices such as, but not limited to, a table, flag, light, camera, and the like.

A steel wire mesh 608 covers the open areas between the exterior side channels 600*a–d,* the interior channel members 602*a–b,* and the interior cross-members 604*a–d.* The wire mesh 608 provides a durable surface to walk or stand upon while the tailgate platform 204 is in the observation stand mode. Conventional welding materials are used in accordance with conventional welding procedures to attach the wire mesh 608 to the tailgate platform 204.

As shown in FIG. 13, the front edge of the tailgate platform 204 attaches to the rear edge of the chassis frame 202 by a hinge plate 230*a–d,* 232*a–d* and hinge pin 228 combination. The tailgate platform 204 is a removable section that can be separated from the chassis frame 202 by removal of the hinge pin 228. When the tailgate platform 204 is in an upright position substantially perpendicular to the chassis frame 202, the tailgate platform 204 functions as a rear door to the chassis frame 202 while the SUT 200 is in the trailer mode. When the rear edge of the tailgate platform 204 is lowered to the ground, the tailgate platform 204 functions as a ramp permitting entry into the rear of the chassis frame 202. The tailgate platform 204 also functions as above-ground platform in the observation stand mode when the platform 204 is raised above the chassis frame 202.

The hinge plates 230*a–d,* 232*a–d* are pieces of square flat bar welded to the front edge of the tailgate platform 204 and corresponding offset sections of flat bar welded on the rear end of the chassis frame 202. A center hole machined in each hinge plate 230*a–d,* 232*a–d* is sized to receive the ½" diameter hinge pin 228. When the front edge of the tailgate platform 204 is oriented parallel with the rear edge of the chassis frame 202, the corresponding offset sections of hinge plates 230*a–d,* 232*a–d* are aligned to receive the hinge pin 228. The hinge plates 230*a–d,* 232*a–d* are made from square steel flat bar approximately 2"×2" in dimension and approximately ⅛" thick.

The hinge pin 228 inserts into the holes of the corresponding hinge plates 230*a–d,* 232*a–d* such that the tailgate platform 204 rotates with respect to the hinge pin 228 and the corresponding hinge plates 230*a–d,* 232*a–d.* A looped end 610 or eye is attached to one end of the hinge pin 228 to assist the user in inserting the hinge pin 228 into or extracting the hinge pin 228 from the hinge plates 230*a–d,* 232*a–d.* The hinge pin 228 is made from steel round bar approximately ½" diameter and approximately 46" in length.

As previously described, in each of the four interior corners of the tailgate platform 204 square tubular steel sections 606*a–d* are positioned to receive the ends of the bowed supports 212*a–c.* The square tubular sections 606*a–d* are made from steel tube approximately 1½"×1½" in dimension and approximately 2" in length. The ends of the bowed supports 212a–c mount within the square tubular supports 606a–d when the supports are installed into the platform 204.

When the tailgate platform 204 is unlatched from the chassis frame 202, the platform 204 swings downward from an upright position. In the observation stand mode, the SUT 200 can have a platform 204 with an enclosure on top of the platform 204. When the bowed supports 212a–c are installed into the square tubular supports 606a–d, the supports 606a–d support the bowed supports 212a–c upright, substantially perpendicular to the top side of the platform 204.

A lock bolt 612a–d mounts into a corresponding bolt hole machined in the side of each square tubular support 606a–d. The lock bolt 612a–d can be tightened within the bolt hole when a bowed support 212a–c is mounted within the square tubular support 606a–d until the lock bolt 612a–d securely holds the end of the bowed support 212a–b within the square tubular support 606a–d.

As shown in FIG. 12, a rear leg bracket 614 attaches to the rear edge of the tailgate platform 204. The rear leg bracket 614 is made from two square pieces of flat bar approximately 2"×2" in dimension and approximately ⅛" thick. The rear leg bracket 614 is positioned in the center outboard side of the rear edge of the tailgate platform 204. The rear leg bracket 614 provides a mount for the rear removable leg 208a which helps to support the platform 204 above the ground while the SUT 200 is in the observation stand mode. The pieces of flat bar are spaced apart to permit the top end of the removable leg 208a to fit within the bracket 614. A single ½41 diameter hole machined through the bracket 614 permits a lock pin 616 to pass through each hole and through corresponding holes machined in the top end of the removable leg 208a to secure the leg 208a to the rear edge of the platform 204. A conventional cotter pin 617 inserts into a hole machined into one end of the lock pin 616 to secure the lock pin 616 in place. A conventional eye 619 on one end of the lock pin 616 permits removal and replacement of the lock pin 616. The lock pin 616 is made from steel round bar approximately ½" diameter and approximately 4½" in length.

FIG. 14 illustrates a side view of a tailgate platform 204 shown in FIG. 2. Lockbar brackets 310a–b mounted on the sides of the tailgate platform 204 perform a dual function. First, these brackets 310a–b support the side legs 208b–c when the SUT 200 is in the observation stand mode. Second, these brackets 310a–b secure the tailgate lockbar 308 which supports the tailgate platform 204 in an upright position when the SUT 200 is in a trailer mode.

The lockbar brackets 310a–b include two pieces of flat bar welded to the side of the tailgate platform 204. The pieces of flat bar are made from two square pieces of steel flat bar approximately 2"×2" in dimension and approximately ⅛" thick. Corresponding holes approximately ½" in diameter are drilled through the center portion of each piece of flat bar to receive a bracket lock pin 618a–b. The bracket lock pin 618a–b is made from a steel round bar approximately ½" in diameter and approximately 4½" in length. When the tailgate platform 204 is in an upright position, and the foot plate 514 at the end of the tailgate lock bar 308 is inserted within the lockbar brackets 310a–b, the lock pin 618a–b inserts within the holes of the flat bar to secure the tailgate lockbar 308. At least one end of the bracket lock pin 618a–b has an eye 620a–b or a loop to assist the user with removing or inserting the bracket lock pin 618a–b. The opposing end of the bracket lock pin 618a–b has a machined pin hole sized to receive a conventional cotter pin 622a–b. After the bracket lock pin 618a–b is inserted into the holes of the pieces of flat bar, the cotter pin 622a–b inserts into the pin hole to secure the bracket lock pin 618a–b to the lockbar brackets 310a–b. The tailgate lockbar 308 can be held securely in position to support the tailgate platform 204 in an upright position substantially perpendicular to the chassis frame 202.

FIGS. 15–17 illustrate a tongue assembly 218 for use with a SUT 200 shown in FIG. 2. FIG. 15 is a side view of the tongue assembly 218 in FIG. 2. FIG. 16 is a front view of the tongue assembly 218 shown in FIG. 2. FIG. 17 is a top view of the tongue assembly 218 shown in FIG. 2. The tongue assembly 218 can include an assembly body 700, a ball hitch socket 702, a safety chain 704, a cable winch 706, and a leveling device 708. The assembly body 700 is a first square steel tubular beam 710 with a second shorter square tubular beam 712 mounted on top side of the first tubular beam 710 towards the front end of the first tubular beam 710. The first tubular beam 710 is made from a steel beam approximately 2"×2" in dimension and approximately 43" in length, and the second tubular beam 712 is made from a steel beam approximately 2"×2" in dimension and approximately 16" in length.

The rear end of the first tubular beam 710 is sized to fit into the square receiving end 414 mounted to the front side of the tongue guide support strut 412. The ball hitch socket 702 mounts over the front end of the first tubular beam 710 and the second tubular beam 712 so that the socket 702 can connect to an opposing ball hitch (not shown) at the rear of a tow vehicle.

A safety chain 704 attached to the side of the first tubular beam 710 is sized to connect to a corresponding safety chain attached to the tow vehicle. This feature increases the factor of safety to the reliability of the connection between the tow vehicle and the SUT 200.

The cable winch 706 mounts to the top side of the second tubular beam 712 towards the front of the assembly body 700. The cable winch 706 is used for pulling the SUT 200 relatively short distances with a cable (not shown) supplied by the cable winch 706. A suitable cable winch 706 has a 1700 lb. capacity, such as a cable winch Model #5407B manufactured by Shelby Industries, Inc. of Shelbyville, Ky.

The leveling device 708 mounts to the side of the first tubular beam 710 towards the center of the assembly body 700. Before the tongue assembly 218 is disconnected from the tow vehicle, the leveling device 708 can be used to raise the ball hitch socket 702 at the front end of the tongue assembly 218 off of the opposing ball hitch. When the opposing ball hitch is removed from the ball hitch socket 702, the leveling device 708 can be operated to lower the front end of the tongue assembly 218 so that the front guide wheel 225 of the SUT 200 supports the front end of the SUT 200.

Electrical cables (not shown) for the SUT 200 brake lighting can be routed from front end of the tongue guide 226 along the side of the first tubular beam 710 of the assembly body 700, and through the second tubular beam 712 to protrude through the ball hitch socket 702 over the front end of the second beam 712. The electrical cables can be fitted with conventional brake lighting connections for connecting to the brake lighting connections of a tow vehicle.

Figure 18:
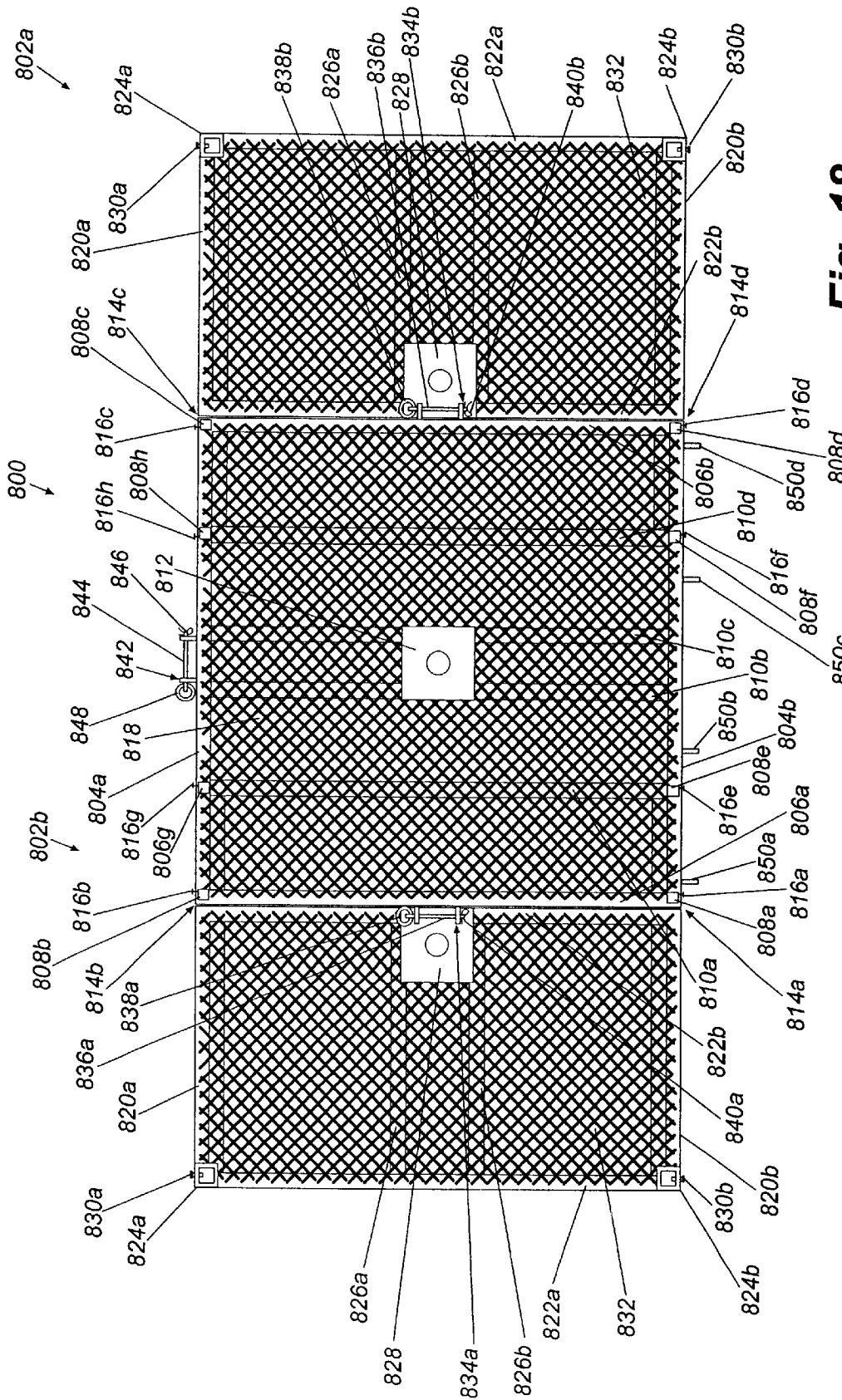
FIG. 18 is a top view of a Supersport tailgate of the SUT shown in FIG. 2.

FIGS. 18–20 illustrate a Supersport tailgate 800 for the SUT 200 shown in FIG. 2. FIG. 18 is a side view of a Supersport tailgate 800 for the SUT 200 shown in FIG. 2.

FIG. 19 is a side view of a Supersport tailgate 800 of the SUT 200 shown in FIG. 2. FIG. 20 is a front view of a Supersport tailgate 800 of the SUT 200 shown in FIG. 2. The Supersport tailgate 800 widens the above-ground platform for the observation stand and permits the mounting of two additional swivel seats on the above-ground platform. The Supersport tailgate 800 is a rectangular-shaped frame with two rectangular-shaped tailgate extensions 802a–b. The Supersport tailgate 800 include tubular members 804a–b and angle members 806a–b. Tubular members 804a–b are positioned at the front end and rear ends of the Supersport tailgate 800. Angle members 806a–b are positioned at the left side and right side of the Supersport tailgate 800. Four square tubular holes 808a–d are machined in the corners of the Supersport tailgate 800 and four more square tubular holes 808e–h are spaced apart on the front and rear tubular members 804a–b. The square tubular holes 808a–h are sized to receive the ends of the bowed supports 212a–c.

Four interior angle members 810a–d are spaced apart and positioned parallel with the side angle members 806a–b between the exterior tubular members 804a–b. The interior angle members 810a–d are spaced apart with the center two interior angle members 810b–c positioned approximately 8" apart from each other. A left interior angle member 810a is spaced evenly between the left side angle member 806a and the left center interior angle member 810b. A right interior angle member 810b is spaced evenly between the right side angle member 806b and the right center interior angle member 810c. Square tubular holes 808e–f are machined on the rear tubular member 804b and square tubular holes 808g–h are machined on the front tubular member 804a to receive an end of a bowed support 212a–c. The square tubular holes 808e–h are spaced apart evenly along the length of the front and rear tubular. members 804a–b respectively.

The tubular members 804a–b are made from square tubular steel beams approximately 1¾"×1¾" in dimension and approximately 48¾" in length. The angle members 806a–b are made from L-shaped steel angle beams approximately 1½"×2" in dimension and approximately 44" in length. The square tubular holes are approximately 1"×1" in dimension. Conventional welding materials used in accordance with conventional welding practices are used to connect the angle members 806a–b to the tubular members 804a–b. Other dimensions and materials can be used depending upon the loading of the Supersport tailgate 800.

A square mounting plate 812, similar to that used to mount the swivel seat post in FIGS. 12–14, attaches to the left center interior angle members 810b and the right center interior angle member 810c. The square plate 812 mounts to the angle members 810b–c with bolts that pass through holes machined through the plate 812 and through the angle members 810a–b. Corresponding nuts secure the bolts to hold the square plate 812 to the angle members 810b–c. A hole machined in the center of the plate 812 is sized to receive a swivel seat post (not shown). The swivel seat post receives a swivel seat 240 similar to that previously described.

The Supersport tailgate 800 has square mounting holes 814a–d at the ends of the exterior tubular members 804a–b to receive corresponding tubular members extending from the sides of the tailgate extensions 802a–b. When the tailgate extensions 802a–b are installed into the square mounting holes 814a–d on the sides of the Supersport tailgate 800, the tailgate extensions 802a–b extend the platform surface of the tailgate 800.

Bowed supports 212a–c removed from the top side of the chassis frame 202 can be mounted to the Supersport tailgate 800 by fitting the ends of the bowed supports 212a–c into the square tubular sections 808a–h along the front and rear tubular exterior members 804a–b. Additional bowed supports can be fabricated to the same or similar dimensions as the bowed supports 212a–c previously described. When installed into the square tubular sections 808a–h, the bowed supports 212a–c extend upward from the top side of the Supersport tailgate 800, spanning the width of the tailgate 800 from the front tubular exterior member 804a to the rear tubular exterior member 804b.

A lock bolt 816a–h mounts into a corresponding hole machined in the side of each exterior tubular member 804a–b next to each square tubular hole 808a–h. The lock bolts 816a–h can be tightened within the bolt holes when a bowed support 212a–c is mounted within the square tubular section 808a–h until the lock bolt 816a–h secures the bowed support 212a–c within the square tubular hole 808a–h.

A steel wire mesh 818 covers the open areas between the exterior tubular members 804a–b and the exterior angle members 806a–b, leaving the square tubular holes 808a–h open to receive the ends of the bowed supports 212a–c. The wire mesh 818 provides a durable surface to walk or stand upon while the Supersport tailgate 800 is in the observation stand mode. Conventional welding materials are used in accordance with conventional welding procedures to attach the wire mesh 818 to the Supersport tailgate 800.

The tailgate extensions 802a–b can be attached into the square mounting holes 814a–d on the left and right sides of the Supersport tailgate 800. The tailgate extensions 802a–b extend the width of the tailgate 800. Each tailgate extension 802a–b has an exterior tubular beam 820a–b forming the front and rear sides of the tailgate extension 802a–b, and an exterior angle member 822a–b forming the left and right sides of the tailgate extension 802a–b. The exterior angle member 822b of the tailgate extensions 802a–b mounts adjacent to the exterior angle member 806a–b of the Supersport tailgate 800, thus this angle member can also be referred to as the inboard angle member. The inboard angle member 822b is positioned towards the center portion of the tailgate extension 802a–b so that the ends of the inboard angle member 822b connect to the tubular beams 820a–b. The other angle member 822a can be referred to as the outboard angle member. The outboard angle member 822a extends parallel to the inboard angle member 822b, and is positioned towards the opposing ends of the tubular beams 820a–b. The tubular beams 820a–b extend past the inboard angle member 822b to permit installation of the ends of the tailgate extension tubular beams 820a–b into the square mounting holes 814a–d at the ends of the tailgate tubular beams 804a–b.

A square tubular steel section 824a is positioned in the corner of the tailgate extension 802a–b between the front tubular member 820a and the outboard angle member 822a. The square tubular steel section is sized to receive an end of a bowed support 212a–c. Likewise, a square tubular steel section 824b is positioned in the corner between the rear tubular member 820b and the outboard angle member 822a to receive an end of a bowed support 212a–c.

Two cross-members 826a–b extend parallel to the front tubular exterior beam 820a and the rear exterior tubular beam 820b. The cross-members 826a–b connect between the angle members 822a–b substantially perpendicular to the angle members 822a–b. The cross-members 826a–b are positioned towards the center portion of the tailgate extension 802a–b, and spaced apart to permit a square mounting plate to be welded between the cross-members 826a–b.

A square plate 828 similar to that used to mount the swivel seat mounting post in FIGS. 12–14, attaches to the two cross-members 826a–b and the inboard angle member 822b. Bolts pass through holes machined through the plate 828a–b and through the cross-members 826a–b to fasten the plate 828 to the cross-members 826a–b. Corresponding nuts secure the bolts to hold the square plate 828a–b to the cross-members 826a–b and the inboard angle member. A hole machined in the center of the plate 828a–b is sized to receive a swivel seat mounting post. The swivel seat mounting post receives a swivel seat 234 similar to that previously described.

The tubular beams 820a–b of the tailgate extensions 802a–b are made from 14 gauge square tubular steel beams approximately 1½"×1½" in dimension and approximately 23½" in length. The angle members 822a–b are made from steel angles approximately 2"×1½" in dimension and approximately 44" in length. The cross-members 826a–b are made from steel angles and are approximately 2"×1½" in dimension and approximately 23½" in length. The square tubular sections are made from 14 gauge tubular steel approximately 1½"×1½" in dimension and approximately 2" in length. Other dimensions and materials can be used depending upon the loading of the tailgate extensions 802a–b and the Supersport tailgate 800.

A lock bolt 830a–b, similar to the Supersport tailgate lock bolts 820a–h, mounts into a corresponding bolt hole machined in the side of each square tubular section 824a–b and each square tubular hole 808a–h of the tailgate extensions 802a–b. The lock bolts 830a–b can be tightened within the bolt hole when a bowed support 212a–b mounts within the square tubular section 824a–d. The tightened lock bolt 830a–b secures the bowed support 212a–c within the square tubular section 824a–d.

A steel wire mesh 832 covers the open areas between the exterior tubular members 820a–b and the angle members 822a–b, leaving the square tubular sections 824a–b open to receive the bowed supports 212a–c. The wire mesh 832 provides a durable surface to walk or stand upon while the tailgate extension 802a–b is in the observation stand mode. Conventional welding materials are used in accordance with conventional welding procedures to attach the wire mesh 832 to the tailgate extensions 802a–b.

Lockbar brackets 834a–b are mounted on the sides of the Supersport tailgate 800 to perform a dual function. First, these brackets 834a–b support the side legs 208b–c when the SUT 200 is in the observation stand mode. Second, these brackets 834a–b secure the tailgate lockbar 308 which supports the Supersport tailgate 800 in an upright position when the SUT 200 is in a trailer mode.

The lockbar brackets 834a–b include two pieces of flat bar welded to the side of the Supersport tailgate 800. The pieces of flat bar are made from two square pieces of steel flat bar approximately 2"×2" in dimension and approximately ⅛" thick. Corresponding holes approximately ½" in diameter are drilled through the center portion of each piece of flat bar to receive a bracket lock pin 836a–b. The bracket lock pin 836a–b is made from a steel round bar approximately ½" in diameter and approximately 4½" in length. When the Supersport tailgate 800 is in an upright position, and the foot plate 514 at the end of the tailgate lock bar 308 is inserted within the lockbar brackets 834a–b, the lock pin 836a–b inserts within the holes of the flat bar to secure the tailgate lockbar 308. At least one end of the bracket lock pin 836a–b has an eye 838a–b or a loop to assist the user with removing or inserting the bracket lock pin 836a–b. The opposing end of the bracket lock pin 836a–b has a machined pin hole sized to receive a conventional cotter pin 840a–b. After the bracket lock pin 836a–b is inserted into the holes of the pieces of flat bar, the cotter pin 840a–b inserts into the pin hole to secure the bracket lock pin 836a–b to the lockbar brackets 834a–b. The tailgate lockbar 308 can be held securely in position to support the Supersport tailgate platform 800 in an upright position substantially perpendicular to the chassis frame 202.

A rear leg bracket 842 attaches to the rear edge of the Supersport tailgate 800. The rear leg bracket 842 is made from two square pieces of flat bar approximately 2"×2" in dimension and approximately ⅛" thick. The rear leg bracket 842 is positioned in the center outboard side of the rear edge of the Supersport tailgate 800. The rear leg bracket 842 provides a mount for the rear removable leg 208a which helps to support the Supersport tailgate 800 above the ground while the SUT 200 is in the observation stand mode. The pieces of flat bar are spaced apart to permit the top end of the removable leg 208a to fit within the bracket 842. A single ½" diameter hole machined through the bracket 842 permits a lock pin 844 to pass through each hole and through corresponding holes machined in the top end of the removable leg 208a to secure the leg 208a to the rear edge of the Supersport tailgate 800. A conventional cotter pin 846 inserts into a hole machined into one end of the lock pin 844 to secure the lock pin 844 in place. A conventional eye 848 on one end of the lock pin 844 permits removal and replacement of the lock pin 844. The lock pin 844 is made from steel round bar approximately ½" diameter and approximately 4½" in length.

For the Supersport tailgate 800 with two tailgate extensions 802a–b, two additional bowed supports, both similar to those described in FIGS. 2, 10–11, can be used to extend the enclosure on top of the tailgate extensions 802a–b. The bowed supports are installed at the outboard ends of the tailgate extensions 802a–b within the square tubular sections 824a–b. The bowed supports mount to the tailgate extensions 802a–b by fitting the ends of each bowed supports into the square tubular sections 824a–b so that the bowed support spans the width of the tailgate extension 802a–b from the front tubular beam 820a to the rear tubular beam 820b. The lock bolts 830a–b can then be tightened to secure the bowed supports 828a–b within the square tubular sections 824a–b.

When the SUT 200 is converted into an observation stand, the tailgate platform 204 can be replaced with the Supersport tailgate 800. By removing the hinge pin 228 from the SUT 200, the tailgate platform 204 can be removed from the rear end of the chassis frame 202.

To mount the Supersport tailgate 800 to the SUT 200, square hinge plates 850a–d similar to those mounted on the front edge of the tailgate platform 204, mount to the front edge of the Supersport tailgate 800. A hole is machined through the center portion of each hinge plate 850a–d to receive the hinge pin 228. When the square hinge plates 850a–d are aligned with the hinge plates 232a–d on the rear edge of the chassis frame 202, the hinge pin 228 can be inserted through the holes of both sets of the hinge plates 232a–d, 850a–d to secure the Supersport tailgate 800 to the rear edge of the chassis frame 202.

In the observation stand mode, the Supersport tailgate 800 forms the above-ground platform for the observation stand. When the bowed supports 212a–c, 834a–b are installed into the square tubular holes 808a–d and the square tubular sections 824a–d, the bowed supports 212a–c, 834a–b are supported upright substantially perpendicular to the top side of the Supersport tailgate 800.

Figure 23:
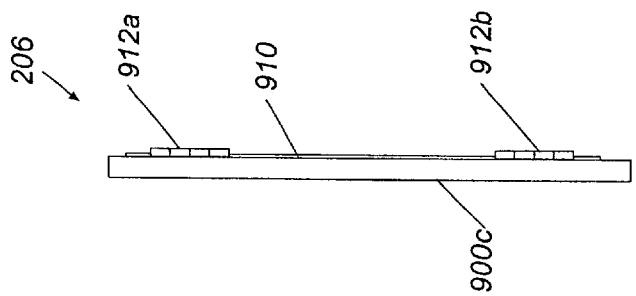
FIG. 23 is a side view of a frontwall panel of the SUT shown in FIG. 2.
Figure 21:
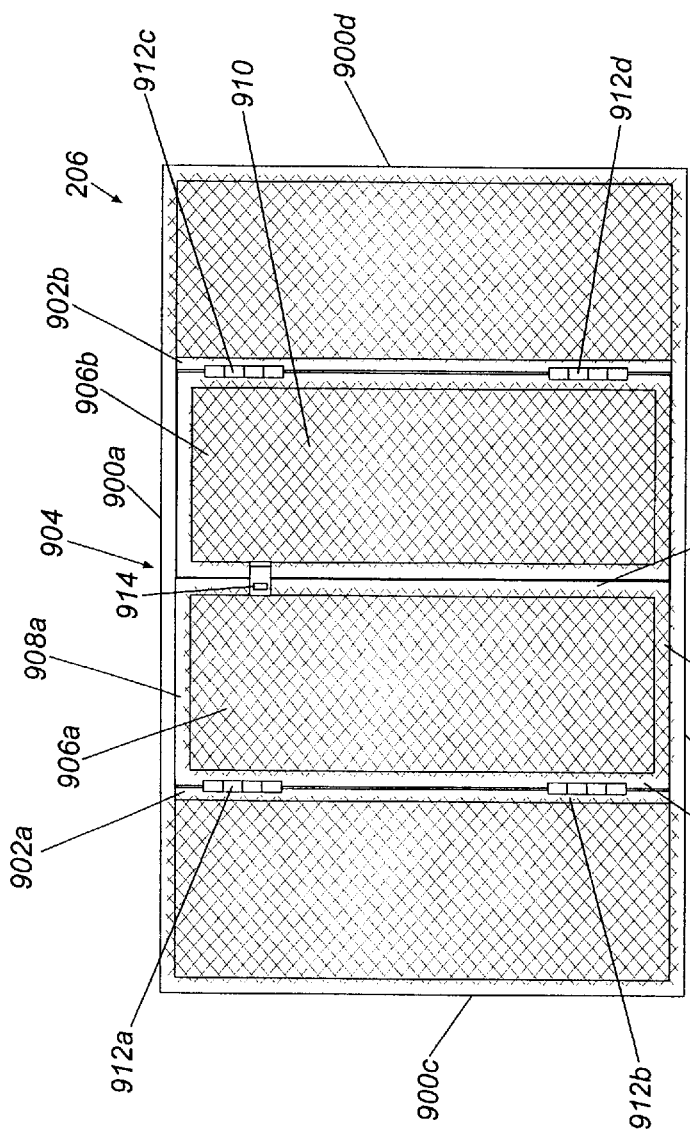
FIG. 21 is a front view of a frontwall panel of the SUT shown in FIG. 2.
Figure 22:
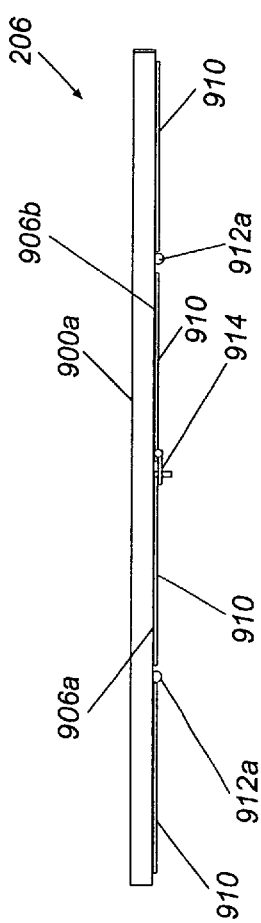
FIG. 22 is a top view of a frontwall panel of the SUT shown in FIG. 2.

FIGS. 21–23 illustrate a frontwall panel 206 for the SUT 200 shown in FIG. 2. The frontwall panel 206 can include exterior angle channels 900a–d and interior tubular beams 902a–b. Two relatively longer exterior angle channels 900a–b are positioned at the top and bottom edge of the frontwall panel 206, while two relatively shorter exterior angle channels 900c–d are positioned between the top edge and the bottom edge at the left and right sides of the panel 206. The ends of the corresponding exterior angle channels 900a–d are then welded to the opposing ends of the other exterior angles channels 900a–d to form the rectangular frame for the frontwall panel 206.

Two interior tubular members 902a–b are positioned parallel with the left side exterior angle channel 900c and the right side exterior angle channel 900d, between the top exterior angle channel 900a and the bottom exterior angle channel 900b. The interior tubular members 902a–b are spaced apart to permit a two-panel door 904 to be hinged to the interior tubular members 902a–b, one panel 906a of the door 904 hinges to the left interior tubular member 902a and the other panel 906b hinges to the right interior tubular member 902b.

Each panel 906a–b of the door 904 can be a rectangular-shaped frame panel including short tubular members 908a–b forming the top and bottom of each panel 906a–b, and long tubular members 908c–d forming the left and right sides of each panel 906a–b. The top tubular member 908a is welded at each end to the top side ends of the left and right side tubular members 908c–d, and the bottom tubular member 908b is welded at the ends to the opposing bottom side ends of the left and right side tubular members 908c–d. A steel wire mesh 910 covers the space between the tubular members 908a–d of each door panel 906a–b to form the panel 906a–b.

Conventional hinges 912a–d are used to attach the door panels 906a–b to the interior tubular members 908a–d of the frontwall panel 206. The door panels 906a–b are positioned to swing outward from the center portion of the frontwall panel 206 to permit entry or access through the frontwall panel 206. Two left side hinges 912a–b are spaced apart where the first hinge 912a is attached to the upper portion of the left interior tubular member 902a to mount the left side long tubular member 908c of the left door panel 906a to the interior tubular member 902a. Likewise, the second hinge 912b is attached to the lower portion of the left interior tubular member 902a to mount the left side long tubular member 908c of the left door panel 906a to the interior tubular member 902a. Two right side hinges 912c–d are spaced apart where the first hinge 912c is attached to the upper portion of the right interiors tubular member 902a to mount the right side long tubular member 908d of the right door panel 906b to the interior tubular member 902b. Likewise, the second hinge 912d is attached to the lower portion of the right interior tubular member 902a to mount the right side long tubular member 908d of the right door panel 906b to the interior tubular member 902b.

A conventional lock 914 or latch can be mounted to the door panels 906a–b to lock the door panels 906a–b together when each of the door panels 906a–b is closed such that each panel 906a–b is substantially parallel with the frontwall panel 206. The lock 914 provides a mechanism to secure the door panels 906a–b to prevent unauthorized access through the frontwall panel 206.

The top and bottom exterior angle channels 900a–b of the frontwall panel 206 can be made from 11 gauge steel angles approximately 1"×1" in dimension and approximately 46" in length. The side exterior angle channels 900c–d of the frontwall panel 206 can be made from 11 gauge steel angles approximately 1"×1" in dimension and approximately 30" in length. The interior tubular members 902a–b of the frontwall panel 206 can be made from square steel tube approximately ½"×½" in dimension and approximately 28" in length. The tubular members 908a–d of the door panels 906a–b can be made from square steel tube approximately ½"×½" in dimension. The left and right side long tubular members 908c–d can be approximately 24" in length, and the top and bottom short tubular members 908a–b can be approximately 12" in length. Other sizes or types of material can be used for the frontwall panel 206 depending upon the sizes and materials used for the structural components of the tailgate or platform the frontwall panel 206 mounts to.

The frontwall panel 206 can be installed between the vertical portions of any of the bowed supports 212a–c when the SUT 200 is in a trailer mode as in FIG. 2. Typically, the frontwall panel 206 is installed between the vertical portions of the bowed support 212c at the front edge of the chassis frame 202 to provide a front wall or front entry to the chassis frame 202. The frontwall panel 206 can be removed from between the vertical portions of the bowed support 212c, and then installed on the top side of the tailgate platform 204 when the SUT 200 is erected into an observation stand. The frontwall panel 206 can then be mounted between the vertical portions of the bowed support 212a at the front edge of the tailgate platform 204 to provide entry into the enclosure on top of the observation stand.

Figure 25:
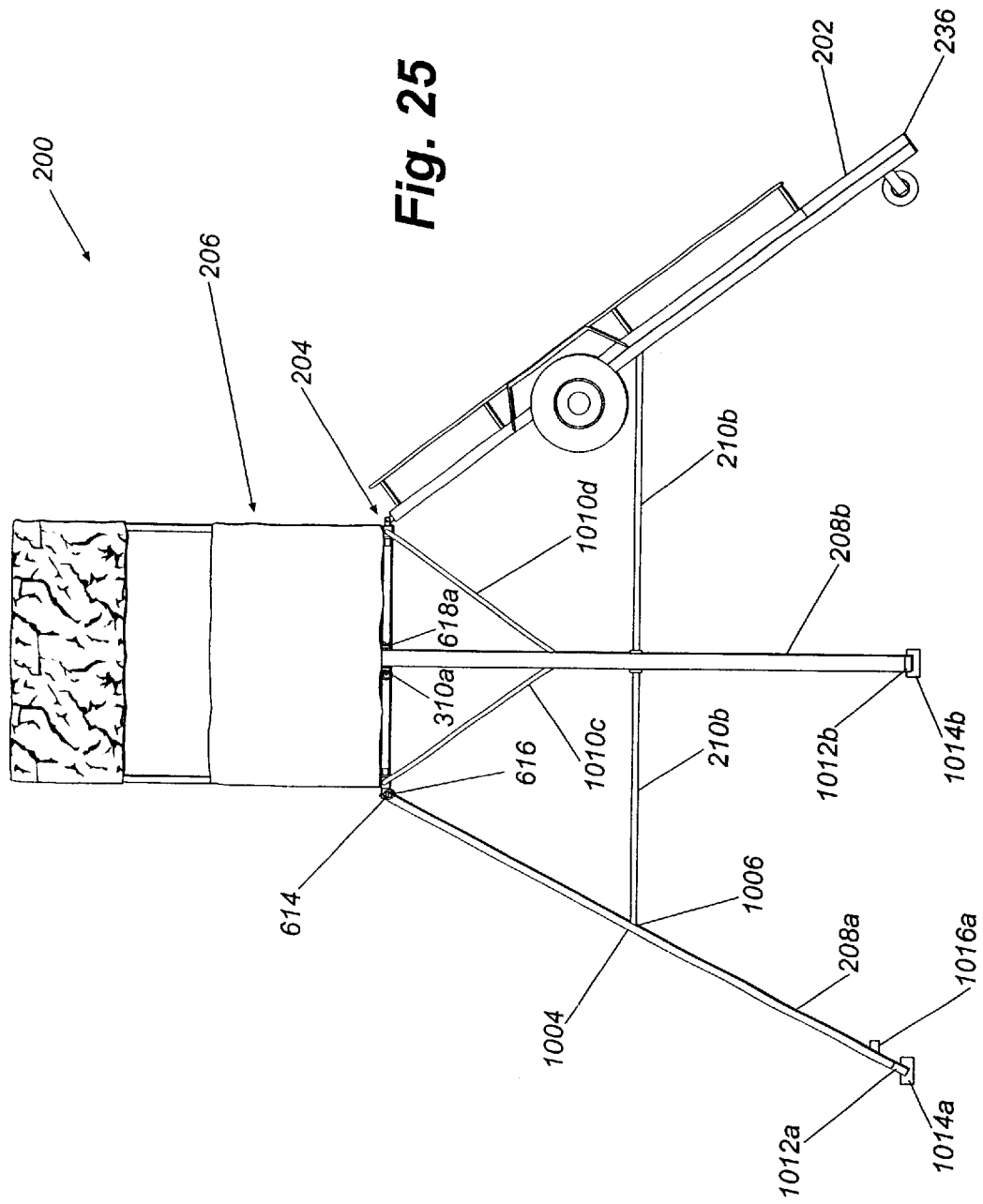
FIG. 25 is a side view of an erected observation stand of the SUT shown in FIG. 2.
Figure 26:
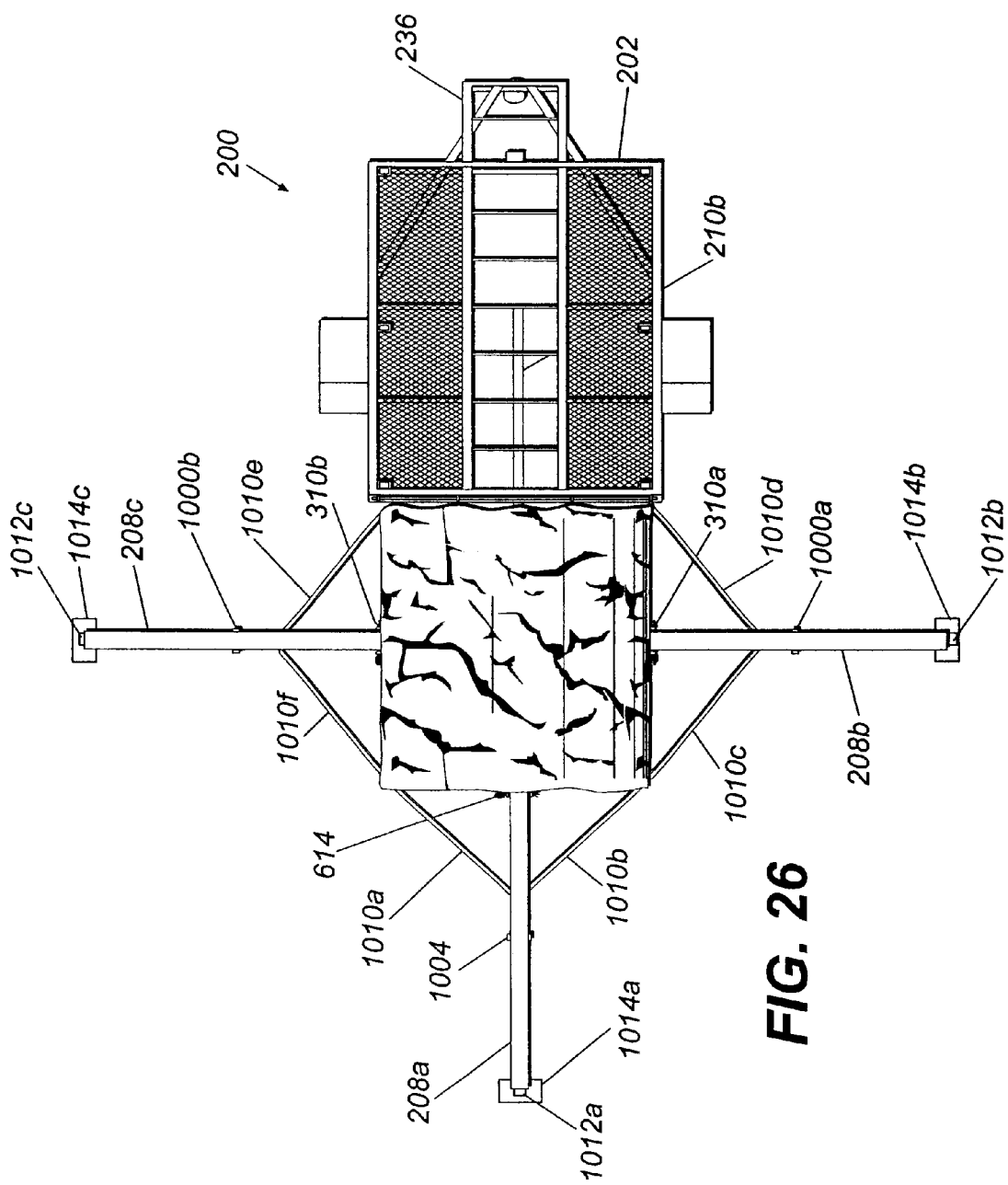
FIG. 26 is a top view of an erected observation stand of the SUT shown in FIG. 2.

FIGS. 24–26 illustrate an erected observation stand converted from a trailer of the SUT 200 shown in FIG. 2. FIG. 24 is a front view of the erected observation stand, FIG. 25 is a side view of the erected observation stand, and FIG. 26 is a top view of the erected observation stand. The above-ground platform used in this embodiment is the tailgate platform 204, although the Supersport tailgate 800 or other embodiments of a tailgate or platform can also be used.

In FIG. 24, the front view of the SUT 200 in an observation stand mode shows the chassis frame 202 in a substantially upright position. After the SUT 200 is erected into an observation stand, the leg struts 210a–b should be positioned to stabilize the observation stand. The chassis frame 202 supports the front end of the tailgate platform 204 above the ground. Removable legs 208a–c mounted to the bottom side of the tailgate platform support the left side, right side, and rear end of the tailgate platform 204 above the ground. The top ends of the legs 208a–c are positioned to fit within brackets 310a–b mounted on the sides of the tailgate platform 204. As described previously, the brackets 310a–b on the left side and the right side of the tailgate platform 204 also function as the tailgate lockbar brackets 310a–b. The rear leg 208a is positioned within the rear leg bracket 614 mounted on the rear end of the tailgate platform 204. Each of the legs 208a–c is secured to a respective bracket 614, 310a–b with a lock pin 616, 618a–b and a cotter pin 617, 622a–b. The top ends of the legs 208a–c have holes machined through the ends to receive the lock pins 616, 618a–b.

As shown in FIGS. 24–25, the leg struts 210a–b connect between the side legs 208b–c, and between the rear leg 208a and the chassis frame 202 to stabilize the observation stand. The rectangular-section leg strut 210a can be positioned between the center portions of the side legs 208b–c. A U-shaped bracket 1000a–b at each end of the rectangular-section leg strut 210a has corresponding holes machined through the arms of the bracket 1000a–b to receive a lock pin 1002a–b. When the U-shaped brackets 1000a–b are positioned to the bottom sides of the side legs 208*b–c* and the leg strut 210*a* is positioned between the side legs 208*b–c*, the lock pin 1002*a–b* can be inserted into the bracket holes and through corresponding holes machined in the sides of the legs 208*b–c*. Cotter pins (not shown) can be inserted into holes machined in the ends of the lock pins to secure the lock pin within the bracket and the legs.

The round-section leg strut 210*b* connects between the center portion of the rear leg 208*a* and the bottom side of the chassis frame 202. When the rectangular-section leg strut 210*a* has been installed between the side legs 208*b–c*, the round section leg strut 210*b* can be inserted through a hole machined in the center portion on the sides of the rectangular-section leg strut 210*a*. A U-shaped bracket 1004 at one end of the round-section leg strut 210*b* has corresponding holes machined through the arms of the bracket 1004 to receive a lock pin 1006. When the U-shaped bracket 1004 is positioned to the bottom side of the rear leg 208*a* and the leg strut 210*b* is positioned between the rear leg 208*a* and the chassis frame 202, the lock pin 1006 inserts into the bracket holes and through corresponding holes machined in the sides of the rear leg 208*a*. Cotter pins (not shown) can be inserted into holes machined in the ends of the lock pin 1006 to secure the lock pin 1006 within the bracket 1004 and the leg 208*a*.

The other end of the round-section leg strut 210*b* has a hook 1008 attached to the end of the strut 210*b*. The hook 1008 is secured onto a corresponding central rung of the ladder 236 of the chassis frame 202. When the hook 1008 is secured onto a rung of the ladder 236, the leg strut 210*b* is secured between the rear leg 208*a* and the chassis frame 202. The configuration of the leg struts 210*a–b* stabilizes the positions of the legs 208*a–c* relative to the chassis frame 202, thus providing a relatively stable observation stand or above-ground platform.

Access to the tailgate platform 204 is provided by climbing to the top of the ladder 236. Entry into the enclosure on top of the platform 204 is provided through the doors of the frontwall panel 206. The swivel seat 240 mounted on the top side of the platform 204 provides a chair for the user while sitting or kneeling.

As shown in FIGS. 24–26, bracing 1010*a–f* can be mounted between each removable leg 208*a–c* and the tailgate platform 204. Two braces 1010*a–f* per removable leg 208*a–c* extend from each of the sides of the tailgate platform 204 to a point approximately 40" down from the top of each removable leg 208*a–c*. A lockpin (not shown) fits through holes machined through the bracing 1010*a–f*, the removable legs 208*a–c*, and the tailgate platform to secure the bracing 1010*a–f* in position relative to the legs 208*a–c* and tailgate platform 204. Cotter pins (not shown) can be used to secure the lockpin. The bracing 1010*a–f* provides additional structural support for each leg 208*a–c* while the SUT 200 is in the observation stand mode. The bracing 1010*a–f* can be made from steel flat bar approximately ¼"×1" in dimension and approximately 48" in length.

Leg extensions 1012*a–c* can be mounted at the bottom ends of the removable legs 208*a–c*. A leg extension 1012*a–c* fits into the end of each of the legs 208*a–c* to extend the length of each leg 208*a–c*, and to provide leveling of the tailgate platform 204 while the SUT 200 is in the observation stand mode. A foot plate 1014*a–c* mounts at the bottom of each leg extension 1012*a–c* to provide additional stability for each leg extension 1012*a–c*. A pair of set screws (not shown) mounts in holes machined on the side of the legs 208*a–c* secures the position of the leg 208*a–c* extension relative the removable leg 1012*a–c*. A receiving end 1016*a–c* for a leveling device 708 mounts to the interior side of each removable leg 208*a–c* to permit the leveling device 708 of the tongue assembly 218 to lift each leg 208*a–c* to extend the leg extensions 1012*a–c*. The leveling device 708 inserts into the receiving end 1016*a–c*, and the leveling device can be adjusted upward or downward to raise or lower each leg to adjustably extend or retract the leg extensions 1012*a–c*.

A leg extension 1012*a–c* can be a tubular steel section approximately 2¾"×1¼" in dimension and approximately 2' in length. The receiving ends 1016*a–c* for a leveling device can be a tubular steel section approximately 1"×1" in dimension and approximately 2" in. length.

In view of the foregoing, it will be appreciated that the invention provides a trailer that can be converted to an observation stand. It should be understood that the foregoing relates only to the exemplary embodiments of the present invention, and that numerous changes may be made therein without departing from the spirit and scope of the invention as defined by the following claims.

The invention claimed is:

1. A trailer capable of being towed behind a vehicle and convertible to an above-ground observation stand comprising:
   a chassis frame configured to support a load above the ground, the chassis frame having,
      a platform with,
         a front end opposing a rear end,
         a top side opposing a bottom side;
      a ladder integrated into the top side of the platform, wherein the ladder provides vertical access from the front end of the platform to the rear end when the rear end is elevated substantially higher than the front end;
   at least one wheel connected to the bottom side of the platform for supporting the platform above the ground during transport of the trailer, wherein the wheel remains substantially in contact with the ground during the elevation of the rear end of the platform to a position substantially higher than the front end;
   a tailgate platform having a bottom side and a top side, wherein the tailgate platform is connected to the rear end of the platform by a hinge, the tailgate platform capable of rotating about the hinge so that the top side of the tailgate platform can be supported substantially above the ground and in a substantially horizontal position with respect to the ground when the rear end of the platform is raised substantially higher than the front end of the platform and the platform is elevated in a vertical position underneath the tailgate platform; and
   at least one leg that can be stored on the platform and removed to connect to the bottom side of the tailgate platform during the elevation of the rear end of the platform into the vertical position, wherein the leg supports the tailgate platform substantially above and in a substantially horizontal position with respect to the ground.

2. The trailer of claim 1, further comprising:
   a tongue guide connected to the front end of the platform for towing the chassis frame behind the tow vehicle.

3. The trailer of claim 2, wherein the tongue guide comprises a ball hitch socket assembly.

4. The trailer of claim 1, further comprising:
   a set of supports that can be removed from the platform, wherein the supports can be mounted to the chassis frame to extend outward from the top side of the platform, and when removed from the top side of the platform, the set of supports can be mounted to the top side of the tailgate platform so that the supports extend outward from the top side of the tailgate platform.

5. The trailer of claim 4, wherein the frontwall panel comprises a door operable for permitting access through the frontwall panel.

6. The trailer of claim 4, wherein the frontwall panel comprises a lockable door configured for restricting access through the frontwall panel.

7. The trailer of claim 4, further comprising at least one removable strut extending between the supports when the supports are connected to the top side of the platform or between the supports when the supports are connected to the top side of the tailgate platform.

8. The trailer of claim 4, further comprising a chassis covering over the supports and positioned over a portion of the top side of the platform.

9. The trailer of claim 8, wherein the chassis covering comprises canvas, nylon, or plastic.

10. The trailer of claim 1, further comprising a removable leg strut extending between at least one leg and a second leg, the removable leg strut capable of rigidly holding the first leg relative to the platform when the tailgate platform is supported above the ground by at least the first leg and the vertically upright platform.

11. The trailer of claim 1, further comprising:
a frontwall panel that connects to either end of the platform, and can be removed to mount to the top side of the tailgate platform when the tailgate platform is substantially parallel with the ground.

12. The trailer of claim 1, wherein the tailgate platform comprises a mounting plate that can receive a swivel seat.

13. The trailer of claim 1, wherein the tailgate platform comprises one or more mounting plates that can receive a plurality of swivel seats.

14. A trailer capable of being towed behind a vehicle and convertible to an above-ground observation stand comprising:
a chassis frame to support a load above the ground, the chassis frame having,
a platform with,
a front end opposing a rear end,
a top side opposing a bottom side;
a ladder integrated into the top side of the platform, wherein the ladder provides vertical access from the front end of the platform to the rear end when the rear end is elevated substantially higher than the front end;
at least one wheel connected to the bottom side of the platform for supporting the platform above the ground during transport of the trailer, wherein the wheel remains substantially in contact with the ground during the elevation of the rear end of the platform to a position substantially higher than the front end;
a tailgate platform having a bottom side and a top side, wherein the tailgate platform is connected to the rear end of the platform by a hinge, the tailgate platform capable of rotating about the hinge so that the top side of the tailgate platform can be supported substantially above the ground and in a substantially horizontal position with respect to the ground when the rear end of the platform is raised substantially higher than the front end of the platform and the platform is elevated in a vertical position underneath the tailgate platform; and at least one leg that can be stored on the platform and removed to connect to the bottom side of the tailgate platform during the elevation of the rear end of the platform into the vertical position, wherein the leg supports the tailgate platform substantially above and in a substantially horizontal position with respect to the ground;
a set of supports that can be removed from the platform, wherein the supports can be mounted to the chassis frame to extend outward from the top side of the platform, and when removed from the top side of the platform, the set of supports can be mounted to the top side of the tailgate platform so that the supports extend outward from the top side of the tailgate platform;
a frontwall panel that connects to either end of the platform, and can be removed to mount to the top side of the tailgate platform when the tailgate platform is substantially parallel with the ground; and
at least one removable strut extending between the supports when the supports are connected to the top side of the platform or between the supports when the supports are connected to the top side of the tailgate platform.

15. The trailer of claim 14, further comprising a chassis covering over the supports and positioned over a portion of the top side of the platform.

16. The trailer of claim 15, wherein the chassis covering comprises canvas, nylon, or plastic.

17. The trailer of claim 14, wherein the tailgate platform comprises a mounting plate that is configured to receive a swivel seat.

18. The trailer of claim 14, The trailer of claim 1, wherein the tailgate platform comprises one or more mounting plates that are configured to receive a plurality of swivel seats.

19. The trailer of claim 14, wherein the tongue guide is configured to attach to a ball hitch socket assembly.

20. The trailer of claim 14, wherein the frontwall panel comprises a door operable for permitting or restricting access through the frontwall panel.

21. The trailer of claim 14, wherein the frontwall panel comprises a lockable door configured for permitting or restricting access through the frontwall panel.

22. A method of converting a trailer to an above ground observation stand, the trailer comprising a tailgate platform hinged to a rear end of a platform, the method comprising the steps:
independently removing legs from the platform, wherein the platform comprises a ladder integrated into a top side of the platform, and each leg can be supported by the top side of the platform when in transport by the trailer;
mounting the legs on the bottom side of the tailgate platform;
affixing opposing ends of the legs to stationary positions on the ground so that the rear end of the platform can be elevated to a substantially higher position than the opposing end of the platform, such that the platform is elevated to a substantially vertical orientation when the tailgate platform is rotated about the hinge such that the tailgate platform becomes substantially horizontal with the ground and with respect to the vertically oriented platform;
positioning the legs beneath the tailgate platform such that the tailgate platform is supported substantially above the ground by the legs and the vertically upright platform.

* * * * *